US008713119B2

(12) United States Patent  
Lindahl

(10) Patent No.: US 8,713,119 B2  
(45) Date of Patent: *Apr. 29, 2014

(54) ELECTRONIC DEVICES WITH VOICE COMMAND AND CONTEXTUAL DATA PROCESSING CAPABILITIES

(75) Inventor: Aram M. Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 13/615,427

(22) Filed: Sep. 13, 2012

(65) Prior Publication Data

US 2013/0006638 A1  Jan. 3, 2013

Related U.S. Application Data

(63) Continuation of application No. 12/244,713, filed on Oct. 2, 2008.

(51) Int. Cl.  
*G06F 15/16* (2006.01)

(52) U.S. Cl.  
USPC ........... 709/206; 709/204; 709/217; 709/227; 704/270; 704/270.1; 704/275; 704/257; 379/93.24; 700/94

(58) Field of Classification Search  
USPC .......... 709/206, 204, 217, 227; 704/270, 275, 704/270.1, 250, 231, 257, 201, 243; 379/93.24, 100.08; 340/534; 381/77, 381/311; 700/94  
See application file for complete search history.

(56) References Cited

U.S. PATENT DOCUMENTS

| 3,704,345 A | 11/1972 | Coker et al. |
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |

(Continued)

FOREIGN PATENT DOCUMENTS

| CH | 681573 A5 | 4/1993 |
| DE | 3837590 A1 | 5/1990 |

(Continued)

OTHER PUBLICATIONS

Alfred App, 2011, http://www.alfredapp.com/, 5 pages.

(Continued)

*Primary Examiner* — Vijay B Chawan  
(74) *Attorney, Agent, or Firm* — Morgan, Lewis & Bockius LLP

(57) ABSTRACT

An electronic device may capture a voice command from a user. The electronic device may store contextual information about the state of the electronic device when the voice command is received. The electronic device may transmit the voice command and the contextual information to computing equipment such as a desktop computer or a remote server. The computing equipment may perform a speech recognition operation on the voice command and may process the contextual information. The computing equipment may respond to the voice command. The computing equipment may also transmit information to the electronic device that allows the electronic device to respond to the voice command.

69 Claims, 7 Drawing Sheets

(56) References Cited

U.S. PATENT DOCUMENTS

| | | |
|---|---|---|
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,614 A | 9/1991 | Bianco |
| 5,057,915 A | 10/1991 | Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,627 A * | 1/1993 | Sweet et al. .................. 704/200 |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,216 A | 3/1998 | Logan et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |

(56) References Cited

U.S. PATENT DOCUMENTS

| | | |
|---|---|---|
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,223 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,394 A | 9/1999 | Gould et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,281 B1 * | 9/2002 | Walters et al. ............ 704/200 |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Want et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |

(56) References Cited

U.S. PATENT DOCUMENTS

| | | | |
|---|---|---|---|
| 6,813,491 B1 | 11/2004 | McKinney | |
| 6,829,603 B1 | 12/2004 | Chai et al. | |
| 6,832,194 B1 | 12/2004 | Mozer et al. | |
| 6,842,767 B1 | 1/2005 | Partovi et al. | |
| 6,847,966 B1 | 1/2005 | Sommer et al. | |
| 6,847,979 B2 | 1/2005 | Allemang et al. | |
| 6,851,115 B1 | 2/2005 | Cheyer et al. | |
| 6,859,931 B1 | 2/2005 | Cheyer et al. | |
| 6,895,380 B2 | 5/2005 | Sepe, Jr. | |
| 6,895,558 B1 | 5/2005 | Loveland | |
| 6,901,399 B1 | 5/2005 | Corston et al. | |
| 6,912,499 B1 | 6/2005 | Sabourin et al. | |
| 6,924,828 B1 | 8/2005 | Hirsch | |
| 6,928,614 B1 | 8/2005 | Everhart | |
| 6,931,384 B1 | 8/2005 | Horvitz et al. | |
| 6,934,684 B2 * | 8/2005 | Alpdemir et al. | 704/265 |
| 6,937,975 B1 | 8/2005 | Elworthy | |
| 6,937,986 B2 | 8/2005 | Denenberg et al. | |
| 6,964,023 B2 | 11/2005 | Maes et al. | |
| 6,980,949 B2 | 12/2005 | Ford | |
| 6,980,955 B2 | 12/2005 | Okutani et al. | |
| 6,985,865 B1 | 1/2006 | Packingham et al. | |
| 6,988,071 B1 | 1/2006 | Gazdzinski | |
| 6,996,531 B2 | 2/2006 | Korall et al. | |
| 6,999,927 B2 | 2/2006 | Mozer et al. | |
| 7,020,685 B1 | 3/2006 | Chen et al. | |
| 7,024,363 B1 * | 4/2006 | Comerford et al. | 704/270 |
| 7,027,974 B1 | 4/2006 | Busch et al. | |
| 7,036,128 B1 | 4/2006 | Julia et al. | |
| 7,050,977 B1 | 5/2006 | Bennett | |
| 7,058,569 B2 | 6/2006 | Coorman et al. | |
| 7,062,428 B2 | 6/2006 | Hogenhout et al. | |
| 7,069,560 B1 | 6/2006 | Cheyer et al. | |
| 7,092,887 B2 | 8/2006 | Mozer et al. | |
| 7,092,928 B1 | 8/2006 | Elad et al. | |
| 7,093,693 B1 | 8/2006 | Gazdzinski | |
| 7,127,046 B1 | 10/2006 | Smith et al. | |
| 7,127,403 B1 | 10/2006 | Saylor et al. | |
| 7,136,710 B1 | 11/2006 | Hoffberg et al. | |
| 7,137,126 B1 | 11/2006 | Coffman et al. | |
| 7,139,714 B2 | 11/2006 | Bennett et al. | |
| 7,139,722 B2 | 11/2006 | Perrella et al. | |
| 7,152,070 B1 | 12/2006 | Musick et al. | |
| 7,177,798 B2 | 2/2007 | Hsu et al. | |
| 7,197,460 B1 | 3/2007 | Gupta et al. | |
| 7,200,559 B2 | 4/2007 | Wang | |
| 7,203,646 B2 | 4/2007 | Bennett | |
| 7,216,073 B2 | 5/2007 | Lavi et al. | |
| 7,216,080 B2 | 5/2007 | Tsiao et al. | |
| 7,225,125 B2 | 5/2007 | Bennett et al. | |
| 7,233,790 B2 | 6/2007 | Kjellberg et al. | |
| 7,233,904 B2 | 6/2007 | Luisi | |
| 7,277,854 B2 | 10/2007 | Bennett et al. | |
| 7,290,039 B1 | 10/2007 | Lisitsa et al. | |
| 7,299,033 B2 | 11/2007 | Kjellberg et al. | |
| 7,310,600 B1 | 12/2007 | Garner et al. | |
| 7,324,947 B2 | 1/2008 | Jordan et al. | |
| 7,349,953 B2 | 3/2008 | Lisitsa et al. | |
| 7,376,556 B2 | 5/2008 | Bennett | |
| 7,376,645 B2 | 5/2008 | Bernard | |
| 7,379,874 B2 | 5/2008 | Schmid et al. | |
| 7,386,449 B2 | 6/2008 | Sun et al. | |
| 7,389,224 B1 | 6/2008 | Elworthy | |
| 7,392,185 B2 | 6/2008 | Bennett | |
| 7,398,209 B2 | 7/2008 | Kennewick et al. | |
| 7,403,938 B2 | 7/2008 | Harrison et al. | |
| 7,409,337 B1 | 8/2008 | Potter et al. | |
| 7,415,100 B2 | 8/2008 | Cooper et al. | |
| 7,418,392 B1 | 8/2008 | Mozer et al. | |
| 7,426,467 B2 | 9/2008 | Nashida et al. | |
| 7,427,024 B1 | 9/2008 | Gazdzinski et al. | |
| 7,447,635 B1 | 11/2008 | Konopka et al. | |
| 7,454,351 B2 | 11/2008 | Jeschke et al. | |
| 7,467,087 B1 | 12/2008 | Gillick et al. | |
| 7,475,010 B2 | 1/2009 | Chao | |
| 7,483,894 B2 | 1/2009 | Cao | |
| 7,487,089 B2 | 2/2009 | Mozer | |
| 7,496,498 B2 | 2/2009 | Chu et al. | |
| 7,496,512 B2 | 2/2009 | Zhao et al. | |
| 7,502,738 B2 | 3/2009 | Kennewick et al. | |
| 7,508,373 B2 | 3/2009 | Lin et al. | |
| 7,522,927 B2 | 4/2009 | Fitch et al. | |
| 7,523,108 B2 | 4/2009 | Cao | |
| 7,526,466 B2 | 4/2009 | Au | |
| 7,529,671 B2 | 5/2009 | Rockenbeck et al. | |
| 7,529,676 B2 | 5/2009 | Koyama | |
| 7,539,656 B2 | 5/2009 | Fratkina et al. | |
| 7,546,382 B2 | 6/2009 | Healey et al. | |
| 7,548,895 B2 | 6/2009 | Pulsipher | |
| 7,552,055 B2 | 6/2009 | Lecoeuche | |
| 7,555,431 B2 | 6/2009 | Bennett | |
| 7,558,730 B2 | 7/2009 | Davis et al. | |
| 7,571,106 B2 | 8/2009 | Cao et al. | |
| 7,599,918 B2 | 10/2009 | Shen et al. | |
| 7,620,549 B2 | 11/2009 | Di Cristo et al. | |
| 7,624,007 B2 | 11/2009 | Bennett | |
| 7,634,409 B2 | 12/2009 | Kennewick et al. | |
| 7,636,657 B2 | 12/2009 | Ju et al. | |
| 7,640,160 B2 | 12/2009 | Di Cristo et al. | |
| 7,647,225 B2 | 1/2010 | Bennett et al. | |
| 7,657,424 B2 | 2/2010 | Bennett | |
| 7,664,638 B2 | 2/2010 | Cooper et al. | |
| 7,672,841 B2 | 3/2010 | Bennett | |
| 7,676,026 B1 | 3/2010 | Baxter, Jr. | |
| 7,684,985 B2 | 3/2010 | Dominach et al. | |
| 7,693,715 B2 | 4/2010 | Hwang et al. | |
| 7,693,720 B2 | 4/2010 | Kennewick et al. | |
| 7,698,131 B2 | 4/2010 | Bennett | |
| 7,702,500 B2 | 4/2010 | Blaedow | |
| 7,702,508 B2 | 4/2010 | Bennett | |
| 7,707,027 B2 | 4/2010 | Balchandran et al. | |
| 7,707,032 B2 | 4/2010 | Wang et al. | |
| 7,707,267 B2 | 4/2010 | Lisitsa et al. | |
| 7,711,565 B1 | 5/2010 | Gazdzinski | |
| 7,711,672 B2 | 5/2010 | Au | |
| 7,716,056 B2 | 5/2010 | Weng et al. | |
| 7,720,674 B2 | 5/2010 | Kaiser et al. | |
| 7,720,683 B1 | 5/2010 | Vermeulen et al. | |
| 7,721,301 B2 | 5/2010 | Wong et al. | |
| 7,725,307 B2 | 5/2010 | Bennett | |
| 7,725,318 B2 | 5/2010 | Gavalda et al. | |
| 7,725,320 B2 | 5/2010 | Bennett | |
| 7,725,321 B2 | 5/2010 | Bennett | |
| 7,729,904 B2 | 6/2010 | Bennett | |
| 7,729,916 B2 | 6/2010 | Coffman et al. | |
| 7,734,461 B2 | 6/2010 | Kwak et al. | |
| 7,747,616 B2 | 6/2010 | Yamada et al. | |
| 7,752,152 B2 | 7/2010 | Paek et al. | |
| 7,756,868 B2 | 7/2010 | Lee | |
| 7,774,204 B2 | 8/2010 | Mozer et al. | |
| 7,783,486 B2 | 8/2010 | Rosser et al. | |
| 7,801,729 B2 | 9/2010 | Mozer | |
| 7,809,570 B2 | 10/2010 | Kennewick et al. | |
| 7,809,610 B2 | 10/2010 | Cao | |
| 7,818,176 B2 | 10/2010 | Freeman et al. | |
| 7,822,608 B2 | 10/2010 | Cross, Jr. et al. | |
| 7,826,945 B2 | 11/2010 | Zhang et al. | |
| 7,831,426 B2 | 11/2010 | Bennett | |
| 7,840,400 B2 | 11/2010 | Lavi et al. | |
| 7,840,447 B2 | 11/2010 | Kleinrock et al. | |
| 7,853,574 B2 | 12/2010 | Kraenzel et al. | |
| 7,853,664 B1 | 12/2010 | Wang et al. | |
| 7,873,519 B2 | 1/2011 | Bennett | |
| 7,873,654 B2 | 1/2011 | Bernard | |
| 7,881,936 B2 | 2/2011 | Longé et al. | |
| 7,890,652 B2 | 2/2011 | Bull et al. | |
| 7,912,702 B2 | 3/2011 | Bennett | |
| 7,917,367 B2 | 3/2011 | Di Cristo et al. | |
| 7,917,497 B2 | 3/2011 | Harrison et al. | |
| 7,920,678 B2 | 4/2011 | Cooper et al. | |
| 7,925,525 B2 | 4/2011 | Chin | |
| 7,930,168 B2 | 4/2011 | Weng et al. | |
| 7,949,529 B2 | 5/2011 | Weider et al. | |
| 7,949,534 B2 | 5/2011 | Davis et al. | |

(56) References Cited

U.S. PATENT DOCUMENTS

| | | |
|---|---|---|
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,032,383 B1 | 10/2011 | Bhardwaj et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 2001/0047264 A1 | 11/2001 | Roundtree |
| 2002/0010584 A1 | 1/2002 | Schultz et al. |
| 2002/0032564 A1 | 3/2002 | Ehsani et al. |
| 2002/0035474 A1 | 3/2002 | Alpdemir |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0116185 A1 | 8/2002 | Cooper et al. |
| 2002/0164000 A1 | 11/2002 | Cohen et al. |
| 2002/0198714 A1 | 12/2002 | Zhou |
| 2004/0135701 A1 | 7/2004 | Yasuda et al. |
| 2004/0199387 A1 | 10/2004 | Wang et al. |
| 2004/0236778 A1 | 11/2004 | Junqua et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | DiFabbrizio et al. |
| 2005/0182629 A1 | 8/2005 | Coorman et al. |
| 2005/0196733 A1 | 9/2005 | Budra et al. |
| 2005/0288936 A1 | 12/2005 | Busayapongchai et al. |
| 2006/0018492 A1 | 1/2006 | Chiu et al. |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0217967 A1 | 9/2006 | Goertzen et al. |
| 2006/0235700 A1 | 10/2006 | Wong et al. |
| 2007/0041361 A1 | 2/2007 | Iso-Sipila |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0082332 A1 | 4/2008 | Mallett et al. |
| 2008/0120112 A1 | 5/2008 | Jordan et al. |
| 2008/0129520 A1 | 6/2008 | Lee |
| 2008/0140416 A1 | 6/2008 | Shostak |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0018835 A1 | 1/2009 | Cooper et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0204409 A1 | 8/2009 | Mozer et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0088020 A1 | 4/2010 | Sano et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |

(56) References Cited

U.S. PATENT DOCUMENTS

| | | | |
|---|---|---|---|
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0311583 A1 | 12/2012 | Gruber et al. |
| 2013/0110518 A1 | 5/2013 | Gruber et al. |
| 2013/0110520 A1 | 5/2013 | Cheyer et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 2001 125896 | 5/2001 |
| JP | 2002 024212 | 1/2002 |
| JP | 2003 517158 A | 5/2003 |
| JP | 2009 036999 | 2/2009 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 00/60435 | 10/2000 |
| WO | WO 00/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | WO 2011/088053 A2 | 7/2011 |

OTHER PUBLICATIONS

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask For," Feb. 9, 2012, http://www.psfk.com/2012/02/multimedia-siri.html, 9 pages.

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Elio, R. et al., "On Abstract Task Models and Conversation Policies," http://webdocs.cs.ualberta.ca/~ree/publications/papers2/ATS.AA99.pdf, May 1999, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

(56) References Cited

OTHER PUBLICATIONS

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10/1016j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

(56) References Cited

OTHER PUBLICATIONS

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, Al Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Notice of Allowance dated Aug. 7, 2012, received in U.S. Appl. No. 12/244,713, 19 pages (Lindahl).
Notice of Allowance dated Jul. 19, 2012, received in U.S. Appl. No. 13/480,422, 21 pages (Lindahl).
Notice of Allowance dated May 10, 2012, received in U.S. Appl. No. 12/244,713, 13 pages (Lindahl).
Office Action Exparte Quayle dated Sep. 10, 2012, received in U.S. Appl. No. 12/244,713, 13 pages (Lindahl).
Office Action dated Dec. 23, 2011, received in U.S. Appl. No. 12/244,713, 13 pages (Lindhahl).
*Phoenix Solutions, Inc.* v. *West Interactive Corp.*, Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ksl-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.

Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep..., 4 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http:// www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
Zue, V., "Conversational Interfaces: Advances and Challenges," Sep. 1997, http://www.cs.cmu.edu/~dod/papers/zue97.pdf, 10 pages.
Zue, V.W., "Toward Systems that Understand Spoken Language," Feb. 1994, ARPA Strategic Computing Institute, © 1994 IEEE, 9 pages.
International Search Report and Written Opinion dated Nov. 29, 2011, received in International Application No. PCT/US2011/20861, which corresponds to U.S. Appl. No. 12/987,982, 15 pages (Thomas Robert Gruber).
Cheyer, A., "A Perspective on Al & Agent Technologies for SCM," VerticalNet, 2001 presentation, 22 pages.
Roddy, D., et al., "Communication and Collaboration in a Landscape of B2B eMarketplaces," VerticalNet Solutions, white paper, Jun. 15, 2000, 23 pages.
Notice of Allowance dated Apr. 1, 2013, received in U.S. Appl. No. 13/604,556, 12 pages. (Lindahl).
Notice of Allowance dated Apr. 2, 2013, received in U.S. Appl. No. 12/244,713, 13 pages. (Lindahl).
Apple Computer, video entitled "Knowledge Navigator," published by Apple Computer no later than 2008, as depicted in "Exemplary Screenshots from video entitled 'Knowledge Navigator,'" 7 pages.
Cheyer, A., et al., video entitled "Demonstration Video of Multimodal Maps Using an Agent Architecture," published by SRI International no later than 1996, as depicted in "Exemplary Screenshots from video entitled 'Demonstration Video of Multimodal Maps Using an Agent Architecture,'" 6 pages.
Cheyer, A., et al., video entitled "Demonstration Video of Multimodal Maps Using an Open-Agent Architecture," published by SRI International no later than 1996, as depicted in "Exemplary Screenshots from video entitled 'Demonstration Video of Multimodal Maps Using an Open-Agent Architecture,'" 6 pages.
Cheyer, A., video entitled "Demonstration Video of Vanguard Mobile Portal," published by SRI International no later than 2004, as depicted in "Exemplary Screenshots from video entitled 'Demonstration Video of Vanguard Mobile Portal,'" 10 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
Notice of Allowance dated Dec. 5, 2012, U.S. Appl. No. 12/244,713, 13 pages (Lindahl).
Office Action—Quayle—dated Jan. 10, 2013, U.S. Appl. No. 13/604,556, 21 pages (Lindahl).
Office Communication dated Dec. 7, 2012, U.S. Appl. No. 12/244,713, 11 pages. (Lindahl).

(56) References Cited

OTHER PUBLICATIONS

Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of the Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley. EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris-France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal ProcesSing (ICASSP'95), May 9-12, 1995, 4 pages.
Bellegarda. J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceeding of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R.. "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department. University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech. And Signal Processing, vol. Assp-28, No. 5, Oct. 1980, 13 pages.
Caminero-Gil, J., et al., "Data-Dtiven Discourse Modeling for Semantic Interpretation," In Proceedings of the IEEE International Conference on' Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.

(56) References Cited

OTHER PUBLICATIONS

Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Corin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://wvvw.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 COMPUTER, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The SPHINIX System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.
Lee, L, et al., "Golden Mandarin(II)—An Improved Single-Chip Real-Time Mandarin Dictation Machine for Chinese Language with Very Large Vocabulary," 0-7803-0946-4/93 © 1993 IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.
Logan, B., "Mel Frequency Cepstral Coefficients for Music Modeling," in International Symposium on Music Information Retrieval, 2000, 2 pages.
Lowerre, B. T., "The-HARPY Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

(56) References Cited

OTHER PUBLICATIONS

Markel, J. D., et al., "Linear Prediction of Speech," Springer-Verlag, Berlin Heidelberg New York 1976, 12 pages.
Morgan, B., "Business Objects," (Business Objects for Windows) Business Objects Inc., DBMS Sep. 1992, vol. 5, No. 10, 3 pages
Mountford, S. J., et al., "Talking and Listening to Computers," The Art of Human-Computer Interface Design, Copyright © 1990 Apple Computer, Inc. Addison-Wesley Publishing Company, Inc., 17 pages.
Murty, K. S. R., et al., "Combining Evidence from Residual Phase and MFCC Features for Speaker Recognition," IEEE Signal Processing Letters, vol. 13, No. 1, Jan. 2006, 4 pages.
Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: a Probabilistic Analysis," Nov. 14, 1997, http://citeseerx.ist.psu.edu/messages/downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.
Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 AT&T, Published by Prentice-Hall, Inc., ISBN: 0-13-285826-6, 17 pages.
Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration-Hypertext?," In Proceedings of Hypertext'87 papers, Nov. 13-15, 1987, 14 pages.
Reynolds, C. F., "On-Line Reviews: A New Application of the HICOM Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
Tenenbaum, A.M., et al., "Data Structure Using Pascal," 1981 Prentice-Hall, Inc., 34 pages.
Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Universite de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, last modified p. date: Oct. 13, 2009, http://en.wikipedia.org/wiki/Mel_scale, 2 pages.
Wikipedia, "Minimum Phase," Wikipedia, the free encyclopedia, last modified p. date: Jan. 12, 2010, http://en.wikipedia.org/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," COMPUTER Magazine, Jan. 1988, © 1988 IEEE, 16 pages.

(56) References Cited

OTHER PUBLICATIONS

Yoon, K., et al., "Letter-to-Sound Rules for Korean," Department of Linguistics, The Ohio State University, 2002, 4 pages.

Zhao, Y., "An Acoustic-Phonetic-Based Speaker Adaptation Technique for Improving SpeakerIndependent Continuous Speech Recognition," IEEE Transactions on Speech and Audio Processing, vol. 2, No. 3, Jul. 1994, 15 pages.

Zovato, E., et al., "Towards Emotional Speech Synthesis: A Rule Based Approach," 5th ISCA Speech Synthesis Workshop—Pittsburgh, Jun. 14-16, 2004, 2 pages.

International Search Report dated Nov. 9, 1994, received in International Application No. PCT/US1993/12666, which corresponds to U.S. Appl. No. 07/999,302, 8 pages. (Robert Don Strong).

International Preliminary Examination Report dated Mar. 1, 1995, received in International Application No. PCT/US1993/12666, which corresponds to U.S. Appl. No. 07/999,302, 5 pages (Robert Don Strong).

International Preliminary Examination Report dated Apr. 10, 1995, received in International Application No. PCT/US1993/12637, which corresponds to U.S. Appl. No. 07/999,354, 7 pages (Alejandro Acero).

International Search Report dated Feb. 8, 1995, received in International Application No. PCT/US1994/11011, which corresponds to U.S. Appl. No. 08/129,679, 7 pages (Yen-Lu Chow).

International Preliminary Examination Report dated Feb. 28, 1996, received in International Application No. PCT/US1994/11011, which corresponds to U.S. Appl. No. 08/129,679, 4 pages (Yen-Lu Chow).

Written Opinion dated Aug. 21, 1995, received in International Application No. PCT/US1994/11011, which corresponds to U.S. Appl. No. 08/129,679, 4 pages (Yen-Lu Chow).

International Search Report dated Nov. 8, 1995, received in International Application No. PCT/US1995/08369, which corresponds to U.S. Appl. No. 08/271,639, 6 pages (Peter V. De Souza).

International Preliminary Examination Report dated Oct. 9, 1996, received in International Application No. PCT/US1995/08369, which corresponds to U.S. Appl. No. 08/271,639, 4 pages (Peter V. De Souza).

Agnäs, MS., et al., "Spoken Language Translator: First-Year Report," Jan. 1994, SICS (ISSN 0283-3638), SRI and Telia Research AB, 161 pages.

Allen, J., "Natural Language Understanding," 2nd Edition, Copyright © 1995 by the Benjamin/Cummings Publishing Company, Inc., 671 pages.

Alshawi, H., et al., "CLARE: A Contextual Reasoning and Cooperative Response Framework for the Core Language Engine," Dec. 1992, SRI International, Cambridge Computer Science Research Centre, Cambridge, 273 pages.

Alshawi, H., et al., "Declarative Derivation of Database Queries from Meaning Representations," Oct. 1991, Proceedings of the BANKAI Workshop on Intelligent Information Access, 12 pages.

Alshawi H., et al., "Logical Forms in the Core Language Engine," 1989, Proceedings of the 27th Annual Meeting of the Association for Computational Linguistics, 8 pages.

Alshawi, H., et al., "Overview of the Core Language Engine," Sep. 1988, Proceedings of Future Generation Computing Systems, Tokyo, 13 pages.

Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z 1992.

Appelt, D., et al., "Fastus: A Finite-state Processor for Information Extraction from Real-world Text," 1993, Proceedings of IJCAI, 8 pages.

Appelt, D., et al., "SRI: Description of the JV-FASTUS System Used for MUC-5," 1993, SRI International, Artificial Intelligence Center, 19 pages.

Appelt, D., et al., SRI International Fastus System MUC-6 Test Results and Analysis, 1995, SRI International, Menlo Park, California, 12 pages.

Archbold, A., et al., "A Team User's Guide," Dec. 21, 1981, SRI International, 70 pages.

Bear, J., et al., "A System for Labeling Self-Repairs in Speech," Feb. 22, 1993, SRI International, 9 pages.

Bear, J., et al., "Detection and Correction of Repairs in Human-Computer Dialog," May 5, 1992, SRI International, 11 pages.

Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.

Bear, J., et al., "Using Information Extraction to Improve Document Retrieval," 1998, SRI International, Menlo Park, California, 11 pages.

Berry, P., et al., "Task Management under Change and Uncertainty Constraint Solving Experience with the CALO Project," 2005, Proceedings of CP'05 Workshop on Constraint Solving under Change, 5 pages.

Bobrow, R. et al., "Knowledge Representation for Syntactic/Semantic Processing," From: AAA-80 Proceedings. Copyright © 1980, AAAI, 8 pages.

Bouchou, B., et al., "Using Transducers in Natural Language Database Query," Jun. 17-19, 1999, Proceedings of 4th International Conference on Applications of Natural Language to Information Systems, Austria, 17 pages.

Bratt, H., et al., "The SRI Telephone-based ATIS System," 1995, Proceedings of ARPA Workshop on Spoken Language Technology, 3 pages.

Bulyko, I. et al., "Error-Correction Detection and Response Generation in a Spoken Dialogue System," © 2004 Elsevier B.V., specom. 2004.09.009, 18 pages.

Burke, R., et al., "Question Answering from Frequently Asked Question Files," 1997, AI Magazine, vol. 18, No. 2, 10 pages.

Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.

Bussler, C., et al., "Web Service Execution Environment (WSMX)," Jun. 3, 2005, W3C Member Submission, http://www.w3.org/Submission/WSMX, 29 pages.

Carter, D., "Lexical Acquisition in the Core Language Engine," 1989, Proceedings of the Fourth Conference of the European Chapter of the Association for Computational Linguistics, 8 pages.

Carter, D., et al., "The Speech-Language Interface in the Spoken Language Translator," Nov. 23, 1994, SRI International, 9 pages.

Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.

Cheyer, A., "About Adam Cheyer," Sep. 17, 2012, http://www.adam.cheyer.com/about.html, 2 pages.

Cheyer, A., "A Perspective on AI & Agent Technologies for SCM," Vertical Net, 2001 presentation, 22 pages.

Cheyer, A., et al., "Multimodal Maps: An Agent-based Approach," International Conference on Cooperative Multimodal Communication, 1995, 15 pages.

Cheyer, A., et al., "The Open Agent Architecture," Autonomous Agents and Multi-Agent systems, vol. 4, Mar. 1, 2001, 6 pages.

Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.

Codd, E. F., "Databases: Improving Usability and Responsiveness— 'How About Recently'," Copyright © 1978, by Academic Press, Inc., 28 pages.

Cohen, P.R., et al., "An Open Agent Architecture," 1994, 8 pages. http://citeseerx.ist.psu.edu/viewdoc/surnmary?doi=10.1.1.30.480.

Coles, L. S., et al., "Chemistry Question-Answering," Jun. 1969, SRI International, 15 pages.

Coles, L. S., "Techniques for Information Retrieval Using an Inferential Question-Answering System with Natural-Language Input," Nov. 1972, SRI International, 198 pages.

(56) References Cited

OTHER PUBLICATIONS

Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Domingue, J., et al., "Web Service Modeling Ontology (WSMO)— An Ontology for Semantic Web Services," Jun. 9-10, 2005, position paper at the W3C Workshop on Frameworks for Semantics in Web Services, Innsbruck, Austria, 6 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of US Patent No. 7,177,798, Mar. 22, 2013, 1 page.
Exhibit 1, "Natural Language Interface Using Constrained Intermediate Dictionary of Results," List of Publications Manually reviewed for the Search of US Patent No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," the Robotics Institute, CarnegieMellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of Eurospeech, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.

(56) References Cited

OTHER PUBLICATIONS

Julia, L., et al., "http://www.speech.sri.com/demos/atis.html," 1997, Proceedings of AAAI, Spring Symposium, 5 pages.

Kahn, M., et al., "CoABS Grid Scalability Experiments," 2003, Autonomous Agents and Multi-Agent Systems, vol. 7, 8 pages.

Kamel, M., et al., "A Graph Based Knowledge Retrieval System," © 1990 IEEE, 7 pages.

Katz, B., "Annotating the World Wide Web Using Natural Language," 1997, Proceedings of the 5th RIAO Conference on Computer Assisted Information Searching on the Internet, 7 pages.

Katz, B., "A Three-Step Procedure for Language Generation," Dec. 1980, Massachusetts Institute of Technology, Artificial Intelligence Laboratory, 42 pages.

Kats, B., et al., "Exploiting Lexical Regularities in Designing Natural Language Systems," 1988, Proceedings of the 12th International Conference on Computational Linguistics, Coling'88, Budapest, Hungary, 22 pages.

Katz, B., et al., "REXTOR: A System for Generating Relations from Natural Language," In Proceedings of the ACL Oct. 2000 Workshop on Natural Language Processing and Information Retrieval (NLP &IR), 11 pages.

Katz, B., "Using English for Indexing and Retrieving," 1988 Proceedings of the 1st RIAO Conference on User-Oriented Content-Based Text and Image (RIAO'88), 19 pages.

Konolige, K., "A Framework for a Portable Natural-Language Interface to Large Data Bases," Oct. 12, 1979, SRI International, Artificial Intelligence Center, 54 pages.

Laird, J., et al., "SOAR: An Architecture for General Intelligence," 1987, Artificial Intelligence vol. 33, 64 pages.

Langly, P., et al.,"A Design for the Icarus Architechture," SIGART Bulletin, vol. 2, No. 4, 6 pages.

Larks, "Intelligent Software Agents: Larks," 2006, downloaded on Mar. 15, 2013 from http://www.cs.cmu.edu/larks.html, 2 pages.

Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.

Martin, D., et al., "Development Tools for the Open Agent Architecture," Apr., 1996, Proceedings of the International Conference on the Practical Application of Intelligent Agents and Multi-Agent Technology, 17 pages.

Martin, D., et al., "Information Brokering in an Agent Architecture," Apr. 1997, Proceedings of the second International Conference on the Practical Application of Intelligent Agents and Multi-Agent Technology, 20 pages.

Martin, D., et al., "PAMM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages.

Milstead, J., et al., "Metadata: Cataloging by Any Other Name . . ." Jan. 1999, Online, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et at., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

Moore, R., et al., "SRI's Experience with the ATIS Evaluation," Jun. 24-27, 1990, Proceedings of a workshop held at Hidden Valley, Pennsylvania, 4 pages.

Moore, et al., "The Information Warefare Advisor: An Architecture for Interacting with Intelligent Agents Across the Web," Dec. 31, 1998 Proceedings of Americas Conference on Information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.comidmoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

OAA, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International, 48 pages.

Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., "Abductive Equivalential Translation and its application to Natural Language Database Interfacing," Sep. 1993 Dissertation paper, SRI International, 163 pages.

Rayner, M., et al., "Adapting the Core Language Engine to French and Spanish," May 10, 1996, Cornell University Library, 9 pages. http://arxiv.org/abs/cmp-lg/9605015.

Rayner, M., et al., "Deriving Database Queries from Logical Forms by Abductive Definition Expansion," 1992, Proceedings of the Third Conference on Applied Natural Language Processing, ANLC'92, 8 pages.

Rayner, M., "Linguistic Domain Theories: Natural-Language Database Interfacing from First Principles," 1993, SRI International, Cambridge, 11 pages.

Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993.html#RaynerBCCDGKKLPPS93.

Roddy, D., et al., "Communication and Collaboration in a Landscape of B2B eMarketplaces," VerticalNet Solutions, white paper, Jun. 15, 2000, 24 pages.

(56) References Cited

OTHER PUBLICATIONS

Rudnicky, A.I., et al., "Creating Natural Dialogs in the Carnegie Mellon Communicator System,", Jan. 1995, 5 pages.
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the Cu Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
SRI2009, "SRI Speech: Products: Software Development Kits: EduSpeak," 2009, 2 pages, available at http://web.archive.org/web/20090828084033/http://www.speechatsri.com/products/eduspeak.shtml.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkom: multimodal communication with a life-like character," 2001 EUROSPEECH-Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, CarnegieMellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.

\* cited by examiner

ELECTRONIC DEVICES WITH VOICE COMMAND AND CONTEXTUAL DATA PROCESSING CAPABILITIES

RELATED APPLICATIONS

This application is a continuation of U.S. patent application Ser. No. 12/244,713, filed Oct. 2, 2008, which is hereby incorporated by reference in its entirety.

BACKGROUND

This invention relates generally to electronic devices, and more particularly, to electronic devices such as portable electronic devices that can capture voice commands and contextual information.

Electronic devices such as portable electronic devices are becoming increasingly popular. Examples of portable devices include handheld computers, cellular telephones, media players, and hybrid devices that include the functionality of multiple devices of this type. Popular portable electronic devices that are somewhat larger than traditional handheld electronic devices include laptop computers and tablet computers.

Portable electronic devices such as handheld electronic devices may have limited speech recognition capabilities. For example, a cellular telephone may have a microphone that can be used to receive and process cellular telephone voice commands that control the operation of the cellular telephone.

Portable electronic devices generally have limited processing power and are not always actively connected to remote databases and services of interest. Conventional devices are often not contextually aware. These shortcomings can make it difficult to use conventional portable electronic devices for sophisticated voice-based control functions.

It would therefore be desirable to be able to provide improved systems for electronic devices such as portable electronic devices that handle voice-based commands.

SUMMARY

A portable electronic device such as a handheld electronic device is provided. The electronic device may have a microphone that is used to receive voice commands. The electronic device may use the microphone to record a user's voice. The recording of the user's voice may be stored as a digital audio file in storage associated with the electronic device.

When the electronic device receives a voice command, the electronic device may store information about the current state of the electronic device and its operating environment as contextual information (metadata). With one suitable arrangement, stored contextual information may include information about the operational state of the electronic device such as which applications are running on the device and their status. The electronic device may determine which portions of the information on the state of the device are relevant to the voice command and may store only the relevant portions. If desired, the electronic device may determine which contextual information is most relevant by performing a speech recognition operation on the recorded voice command to look for specific keywords.

The electronic device may process voice commands locally or voice commands processing may be performed remotely. For example, the electronic device may transmit one or more recorded voice commands and associated contextual information to computing equipment such as a desktop computer. Captured voice commands and contextual information may also be uploaded to server computing equipment over a network. The electronic device may transmit recorded voice commands and the associated contextual information at any suitable time such as when instructed by a user, as each voice command is received, immediately after each voice command is received, whenever the electronic device is synched with appropriate computing equipment, or other suitable times.

After a recorded voice command and associated contextual information have been transferred to a desktop computer, remote server, or other computing equipment, the computing equipment may process the voice command using a speech recognition operation. The computing equipment may use the results of the speech recognition operation and any relevant contextual information together to respond to the voice command properly. For example, the computing equipment may respond to the voice command by displaying search results or performing other suitable actions). If desired, the computing equipment may convey information back to the electronic device in response to the voice command.

In a typical scenario, a user may make a voice command while directing the electronic device to record the voice command. The user may make the voice command while the electronic device is performing a particular operation with an application. For example, the user may be using the electronic device to play songs with a media application. While listening to a song, the user may press a record button on the electronic device to record the voice command "find more like this." The voice command may be processed by the electronic device (e.g., to create a code representative of the spoken command) or may be stored in the form of an audio clip by the electronic device. At an appropriate time, such as when the electronic device is connected to a host computer or a remote server through a communications path, the code or the audio clip corresponding to the spoken command may be uploaded for further processing. Contextual information such as information on the song that was playing in the media application when the voice command was made may be uploaded with the voice command.

A media playback application on a computer such as the iTunes program of Apple Inc. may take an appropriate action in response to an uploaded voice command and associated contextual data. As an example, the media playback application may present a user with recommended songs for purchase. The songs that are recommended may be songs that are similar to the song that was playing on the electronic device when the user captured the audio clip voice command "find more like this."

The computer to which the voice command audio clip is uploaded may have greater processing power available than that available on a handheld electronic device, so voice processing accuracy may be improved by offloading voice recognition operations to the computer from the handheld electronic device in this way. The computer to which the audio clip is uploaded may also have access to more extensive data that would be available on a handheld electronic device such as the contents of a user's full home media library. The computer that receives the uploaded command may also have access to online resources such as an online server database. This database may have been difficult or impossible for the user to access from the handheld device when the voice command was captured.

If desired, the contextual information that is captured by the electronic device in association with a captured voice command may include audio information. For example, a user may record a spoken phrase. Part of the spoken phrase may represent a voice command and part of the spoken phrase may include associated contextual information. As an example, a user may be using a mapping application on a handheld electronic device. The device may be presenting the user with a map that indicates the user's current position. The user may press a button or may otherwise instruct the handheld electronic device to record the phrase "I like American restaurants in this neighborhood." In response, the electronic device may record the spoken phrase. The recorded phrase (in this example), includes a command portion ("I like") that instructs the mapping application to create a bookmark or other indicator of the user's preference. The recorded phrase also includes the modifier "American restaurants" to provide partial context for the voice command. Additional contextual information (i.e., the phrase "in this neighborhood) and accompanying position data (e.g., geographic coordinates from global positioning system circuitry in the device) may also be supplied in conjunction with the recorded voice command. When uploaded, the audio clip voice command and the associated audio clip contextual information can be processed by speech recognition software and appropriate actions taken.

Further features of the invention, its nature and various advantages will be more apparent from the accompanying drawings and the following detailed description of the preferred embodiments.

DETAILED DESCRIPTION

The present invention relates to using voice commands to control electronic systems.

Voice commands may be captured with an electronic device and uploaded to computing equipment for further processing. Electronic devices that may be used in this type of environment may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the portable electronic devices may be wireless electronic devices.

The wireless electronic devices may be, for example, handheld wireless devices such as cellular telephones, media players with wireless communications capabilities, handheld computers (also sometimes called personal digital assistants), global positioning system (GPS) devices, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

Figure 1:
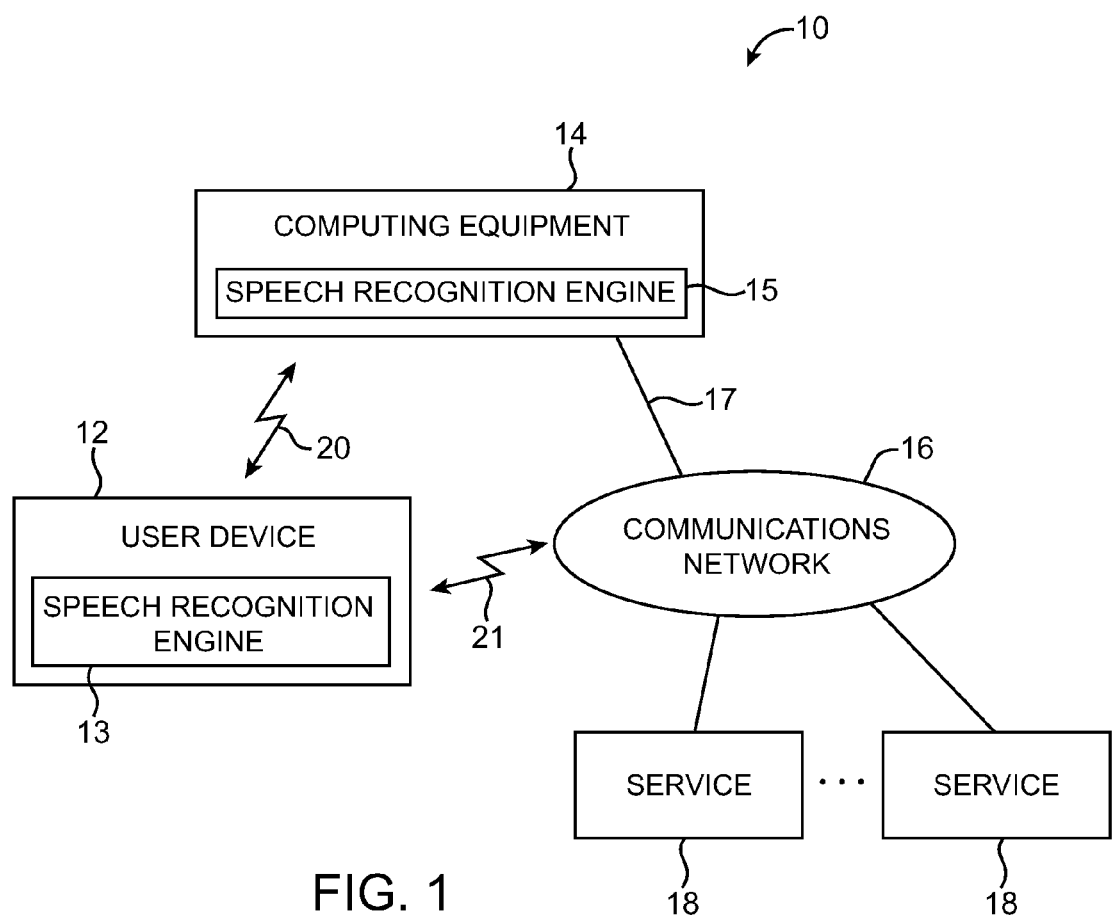
FIG. 1 is a diagram of an illustrative system environment in which a portable electronic device and computing equipment with speech recognition functionality may be used in accordance with an embodiment of the present invention.

An illustrative environment in which a user may interact with system components using voice commands is shown in FIG. 1. A user in system 10 may have an electronic device such as user device 12. User device 12 may be used to receive voice commands (e.g., to record a user's voice). If device 12 has sufficient processing power, the voice commands may be partly or fully processed by user device 12 (e.g., using a speech recognition engine such as speech recognition engine 13). If desired, the voice commands may be transmitted by user device 12 to computing equipment 14 over communications path 20. Voice commands may also be conveyed to remote services 18 over network 16 (e.g., via path 21 or via path 20, equipment 14, and path 17).

When user device 12 transmits voice commands to computing equipment 14, the user device may include contextual information along with the voice commands. User device 12, computing equipment 14, and services 18 may be connected through a network such as communications network 16. Network 16 may be, for example, a local area network, a wide area network such as the Internet, a wired network, a wireless network, or a network formed from multiple networks of these types. User device 12 may connect to communications network 16 through a wired or wireless communications path such as path 21 or may connect to network 16 via equipment 14. In one embodiment of the invention, user device 12 may transmit voice commands and contextual information to computing equipment 14 through communications network 16. User device 12 may also transmit voice commands and contextual information to computing equipment 14 directly via communications path 20. Path 20 may be, for example, a universal serial bus (USB®) path or any other suitable wired or wireless path.

User device 12 may have any suitable form factor. For example, user device 12 may be provided in the form of a handheld device, desktop device, or even integrated as part of a larger structure such as a table or wall. With one particularly suitable arrangement, which is sometimes described herein as an example, user device 12 may be provided with a handheld form factor. For example, device 12 may be a handheld electronic device. Illustrative handheld electronic devices that may be provided with voice command recording capabilities include cellular telephones, media players, media players with wireless communications capabilities, handheld computers (also sometimes called personal digital assistants), global positioning system (GPS) devices, handheld gaming devices, and other handheld devices. If desired, user device 12 may be a hybrid device that combines the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, supports web browsing, and includes media player functionality. These are merely illustrative examples.

Computing equipment 14 may include any suitable computing equipment such as a personal desktop computer, a laptop computer, a server, etc. With one suitable arrangement, computing equipment 14 is a computer that establishes a wired or wireless connection with user device 12. The computing equipment may be a server (e.g., an internet server), a local area network computer with or without internet access, a user's own personal computer, a peer device (e.g., another user device 12), any other suitable computing equipment, and combinations of multiple pieces of computing equipment. Computing equipment 14 may be used to implement applications such as media playback applications (e.g., iTunes® from Apple Inc.), a web browser, a mapping application, an email application, a calendar application, etc.

Computing equipment 18 (e.g., one or more servers) may be associated with one or more online services.

Communications path 17 and the other paths in system 10 such as path 20 between device 12 and equipment 14, path 21 between device 12 and network 16, and the paths between network 16 and services 18 may be based on any suitable wired or wireless communications technology. For example, the communications paths in system 10 may be based on wired communications technology such as coaxial cable, copper wiring, fiber optic cable, universal serial bus (USB®), IEEE 1394 (FireWire®), paths using serial protocols, paths using parallel protocols, and Ethernet paths. Communications paths in system 10 may, if desired, be based on wireless communications technology such as satellite technology, radio-frequency (RF) technology, wireless universal serial bus technology, and Wi-Fi® or Bluetooth® 802.11 wireless link technologies. Wireless communications paths in system 10 may also include cellular telephone bands such as those at 850 MHz, 900 MHz, 1800 MHz, and 1900 MHz (e.g., the main Global System for Mobile Communications or GSM cellular telephone bands), one or more proprietary radio-frequency links, and other local and remote wireless links. Communications paths in system 10 may also be based on wireless signals sent using light (e.g., using infrared communications) or sound (e.g., using acoustic communications).

Communications path 20 may be used for one-way or two-way transmissions between user device 12 and computing equipment 14. For example, user device 12 may transmit voice commands and contextual information to computing equipment 14. After receiving voice commands and contextual information from user device 12, computing equipment 14 may process the voice commands and contextual information using a speech recognition engine such as speech recognition engine 15. Engine 15 may be provided as a standalone software component or may be integrated into a media playback application or other application. If desired, computing equipment 14 may transmit data signals to user device 12. Equipment 14 may, for example, transmit information to device 12 in response to voice commands transmitted by device 12 to system 14. For example, when a voice command transmitted by device 12 includes a request to search for information, system 14 may transmit search results back to device 12.

Communications network 16 may be based on any suitable communications network or networks such as a radio-frequency network, the Internet, an Ethernet network, a wireless network, a Wi-Fi® network, a Bluetooth® network, a cellular telephone network, or a combination of such networks.

Services 18 may include any suitable online services. Services 18 may include a speech recognition service (e.g., a speech recognition dictionary), a search service (e.g., a service that searches a particular database or that performs Internet searches), an email service, a media service, a software update service, an online business service, etc. Services 18 may communicate with computing equipment 14 and user device 12 through communications network 16.

In typical user, user device 12 may be used to capture voice commands from a user during the operation of user device 12. For example, user device 12 may receive one or more voice commands during a media playback operation (e.g., during playback of a music file or a video file). User device 12 may then store information about its current operational state as contextual information. User device 12 may record information related to the current media playback operation. Other contextual information may be stored when other applications are running on device 12. For example, user device 12 may store information related to a web-browsing application, the location of user device 12, or other appropriate information on the operating environment for device 12. Following the reception of a voice command, user device 12 may, if desired, perform a speech recognition operation on the voice command. User device 12 may utilize contextual information about the state of the user device at the time the voice command was received during the associated speech recognition operation.

In addition to or in lieu of performing a local speech recognition operation on the voice command using engine 13, user device 12 may forward the captured voice command audio clip and, if desired, contextual information to computing equipment 14 for processing. Computing equipment 14 may use engine 15 to implement speech recognition capabilities that allow computing equipment 14 to respond to voice commands that user device 12 might otherwise have difficulties in processing. For example, if user device 12 were to receive a voice command to "find Italian restaurants near me," user device 12 might not be able to execute the voice command immediately for reasons such as an inability to perform adequate speech processing due to a lack of available processing power, an inability to perform a search requested by a voice command due to a lack of network connectivity, etc. In this type of situation, device 12 may save the voice command (e.g., as a recorded audio file of a user's voice) and relevant contextual information (e.g., the current location of user device 12) for transmission to computing equipment 14 for further processing of the voice command. Device 12 may transmit voice commands and contextual information to computing equipment 14 at any suitable time (e.g., when device 12 is synched with computing equipment 14, as the voice commands are received by device 12, whenever device 12 is connected to a communications network, etc.). These transmissions may take place simultaneously or as two separate but related transmissions.

With one suitable arrangement, device 12 may save all available contextual information. With another arrangement, device 12 may perform a either a cursory or a full speech recognition operation on voice commands to determine what contextual information is relevant and then store only the relevant contextual information. As an example, user device 12 may search for the words "music" and "location" in a voice command to determine whether the contextual information stored in association with the voice command should include information related to a current media playback operation or should include the current location of user device 12 (e.g., which may be manually entered by a user or may be determined using a location sensor).

Figure 2:
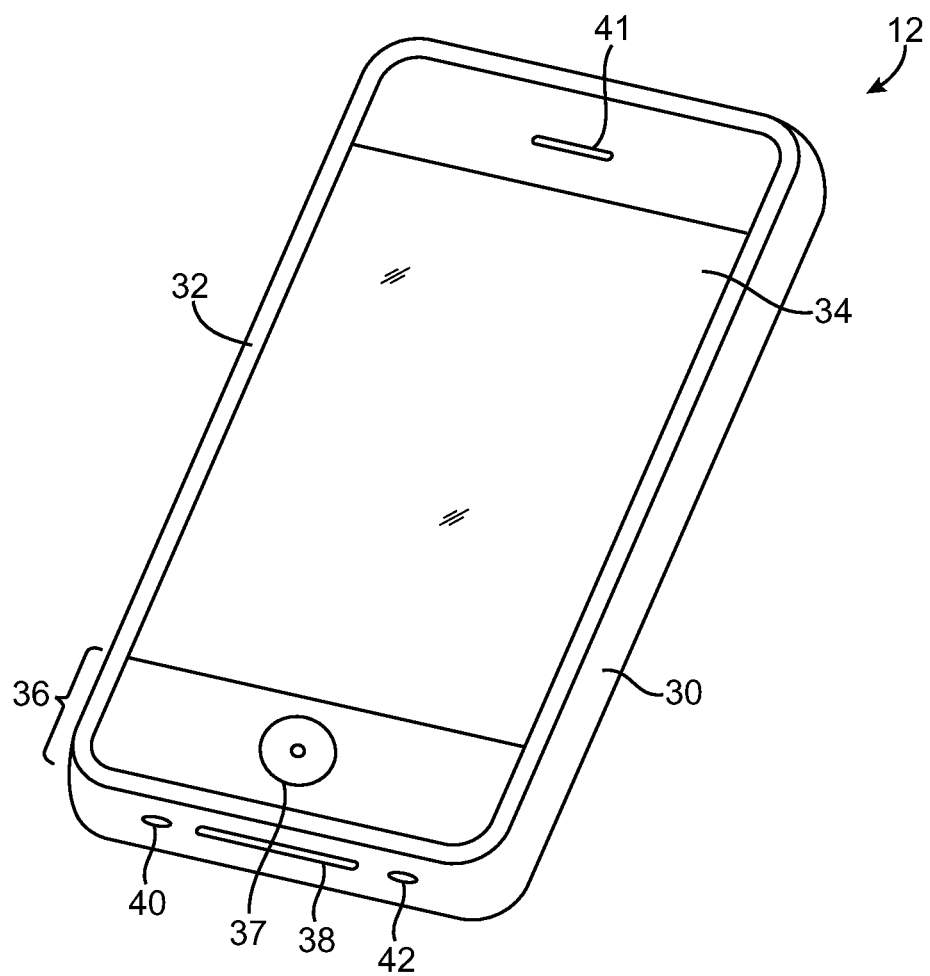
FIG. 2 is a perspective view of an illustrative portable electronic device in accordance with an embodiment of the present invention.

An illustrative user device 12 in accordance with an embodiment of the present invention is shown in FIG. 2. User device 12 may be any suitable electronic device such as a portable or handheld electronic device.

User device 12 may handle communications over one or more wireless communications bands such as local area network bands and cellular telephone network bands.

Device 12 may have a housing 30. Display 34 may be attached to housing 30 using bezel 32. Display 34 may be a touch screen liquid crystal display (as an example).

Device 12 may have a microphone for receiving voice commands. Openings 42 and 40 may, if desired, form microphone and speaker ports. With one suitable arrangement, device 12 may have speech recognition capabilities (e.g., a speech recognition engine that can be used to receive and process voice commands from a user). Device 12 may also have audio capture and playback capabilities. Device 12 may be able to receive voice commands from a user and other audio though a microphone (e.g., formed as part of one or more ports such as openings 40 and 42). Port 41 may be, for example, a speaker sport. If desired, device 12 may activate its audio recording and/or speech recognition capabilities (e.g., device 12 may begin recording audio signals associated with a user's voice with a microphone) in response to user input. For example, device 12 may present an on-screen selectable option to the user to activate speech recognition functionality. Device 12 may also have a user input device such as button 37 that is used to receive user input to activate speech recognition functionality.

User device 12 may have other input-output devices. For example, user device 12 may have other buttons. Input-output components such as port 38 and one or more input-output jacks (e.g., for audio and/or video) may be used to connect device 12 to computing equipment 14 and external accessories. Button 37 may be, for example, a menu button. Port 38 may contain a 30-pin data connector (as an example). Suitable user input interface devices for user device 12 may also include buttons such as alphanumeric keys, power on-off, power-on, power-off, voice memo, and other specialized buttons, a touch pad, pointing stick, or other cursor control device, or any other suitable interface for controlling user device 12. In the example of FIG. 2, display screen 34 is shown as being mounted on the front face of user device 12, but display screen 34 may, if desired, be mounted on the rear face of user device 12, on a side of user device 12, on a flip-up portion of user device 12 that is attached to a main body portion of user device 12 by a hinge (for example), or using any other suitable mounting arrangement. Display 34 may also be omitted Although shown schematically as being formed on the top face of user device 12 in the example of FIG. 2, buttons such as button 37 and other user input interface devices may generally be formed on any suitable portion of user device 12. For example, a button such as button 37 or other user interface control may be formed on the side of user device 12. Buttons and other user interface controls can also be located on the top face, rear face, or other portion of user device 12. If desired, user device 12 can be controlled remotely (e.g., using an infrared remote control, a radio-frequency remote control such as a Bluetooth® remote control, etc.). With one suitable arrangement, device 12 may receive voice commands and other audio through a wired or wireless headset or other accessory. Device 12 may also activate its speech recognition functionality in response to user input received through a wired or wireless headset (e.g., in response to a button press received on the headset).

Device 12 may use port 38 to perform a synchronization operation with computing equipment 14. With one suitable arrangement, device 12 may transmit voice commands and contextual information to computing equipment 14. For example, during a media playback operation, device 12 may receive a voice command to "find more music like this." If desired, device 12 may upload the voice command and relevant contextual information (e.g., the title and artist of the media file that was playing when the voice command was received) to computing equipment 14. Computing equipment 14 may receive and process the voice command and relevant contextual information and may perform a search for music that is similar to the media file that was playing when the voice command was received. Computing equipment 14 may then respond by displaying search results, purchase recommendations, etc.

Device 12 may receive data signals from computing equipment 14 in response to uploading voice commands and contextual information. The data received by device 12 from equipment 14 in response to voice commands and contextual information may be used by device 12 to carry out requests associated with the voice commands. For example, after processing the voice command and contextual information, computing equipment 14 may transmit results associated with the voice command to user device 12 which may then display the results.

Figure 3:
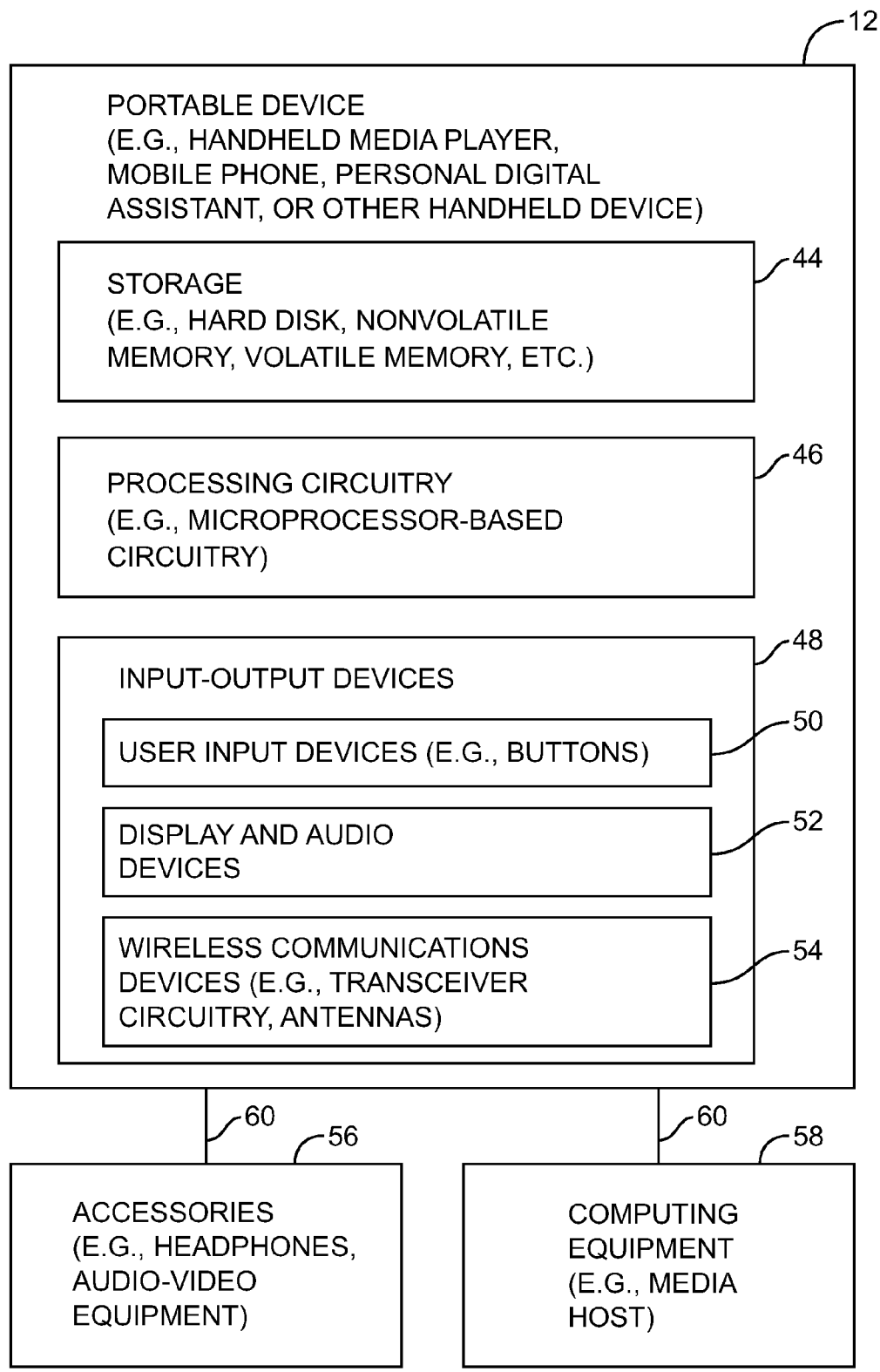
FIG. 3 is a schematic diagram of an illustrative portable electronic device in accordance with an embodiment of the present invention.

A schematic diagram of an embodiment of an illustrative user device 12 is shown in FIG. 3. User device 12 may be a mobile telephone, a mobile telephone with media player capabilities, a media player, a handheld computer, a game player, a global positioning system (GPS) device, a combination of such devices, or any other suitable electronic device such as a portable device.

As shown in FIG. 3, user device 12 may include storage 44. Storage 44 may include one or more different types of storage such as hard disk drive storage, nonvolatile memory (e.g., flash memory or other electrically-programmable-read-only memory), volatile memory (e.g., battery-based static or dynamic random-access-memory), etc. Storage 44 may be used to store voice commands and contextual information about the state of device 12 when voice commands are received.

Processing circuitry 46 may be used to control the operation of user device 12. Processing circuitry 46 may be based on a processor such as a microprocessor and other suitable integrated circuits. With one suitable arrangement, processing circuitry 46 and storage 44 are used to run software on user device 12, such as speech recognition applications, internet browsing applications, voice-over-internet-protocol (VOIP) telephone call applications, email applications, media playback applications, operating system functions (e.g., operating system functions supporting speech recognition capabilities), etc. Processing circuitry 46 and storage 44 may be used in implementing analog-to-digital conversion functions for capturing audio and may be used to implement speech recognition functions.

Input-output devices 48 may be used to allow data to be supplied to user device 12 and to allow data to be provided from user device 12 to external devices. Display screen 34, button 37, microphone port 42, speaker port 40, speaker port 41, and dock connector port 38 are examples of input-output devices 48.

Input-output devices 48 can include user input devices 50 such as buttons, touch screens, joysticks, click wheels, scrolling wheels, touch pads, key pads, keyboards, microphones, cameras, etc. A user can control the operation of user device 12 by supplying commands through user input devices 50. Display and audio devices 52 may include liquid-crystal display (LCD) screens or other screens, light-emitting diodes (LEDs), and other components that present visual information and status data. Display and audio devices 52 may also include audio equipment such as speakers and other devices for creating sound. Display and audio devices 52 may contain audio-video interface equipment such as jacks and other connectors for external headphones, microphones, and monitors.

Wireless communications devices 54 may include communications circuitry such as radio-frequency (RF) transceiver circuitry formed from one or more integrated circuits, power amplifier circuitry, passive RF components, one or more antennas, and other circuitry for handling RF wireless signals. Wireless signals can also be sent using light (e.g., using infrared communications circuitry in circuitry 54).

User device 12 can communicate with external devices such as accessories 56 and computing equipment 58, as shown by paths 60. Paths 60 may include wired and wireless paths (e.g., bidirectional wireless paths). Accessories 56 may include headphones (e.g., a wireless cellular headset or audio headphones) and audio-video equipment (e.g., wireless speakers, a game controller, or other equipment that receives and plays audio and video content).

Computing equipment 58 may be any suitable computer such as computing equipment 14 or computing equipment 18 of FIG. 1. With one suitable arrangement, computing equipment 58 is a computer that has an associated wireless access point (router) or an internal or external wireless card that establishes a wireless connection with user device 12. The computer may be a server (e.g., an internet server), a local area network computer with or without internet access, a user's own personal computer, a peer device (e.g., another user device 12), or any other suitable computing equipment. Computing equipment 58 may be associated with one or more online services. A link such as link 60 may be used to connect device 12 to computing equipment such as computing equipment 14 of FIG. 1.

Wireless communications devices 54 may be used to support local and remote wireless links. Examples of local wireless links include infrared communications, Wi-Fi® (IEEE 802.11), Bluetooth®, and wireless universal serial bus (USB) links.

If desired, wireless communications devices 54 may include circuitry for communicating over remote communications links. Typical remote link communications frequency bands include the cellular telephone bands at 850 MHz, 900 MHz, 1800 MHz, and 1900 MHz, the global positioning system (GPS) band at 1575 MHz, and data service bands such as the 3G data communications band at 2170 MHz band (commonly referred to as UMTS or Universal Mobile Telecommunications System). In these illustrative remote communications links, data is transmitted over links 60 that are one or more miles long, whereas in short-range links 60, a wireless signal is typically used to convey data over tens or hundreds of feet.

Figure 4:
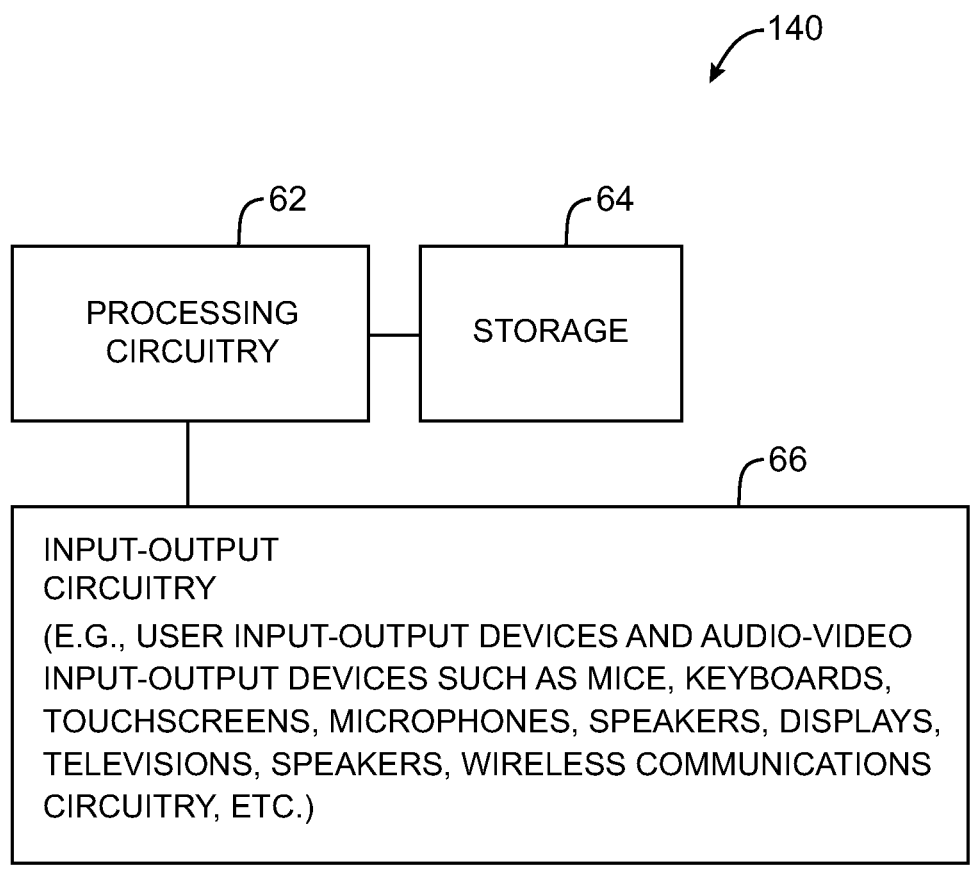
FIG. 4 is a schematic diagram of illustrative computing equipment that may be used in processing voice commands from a portable electronic device in accordance with an embodiment of the present invention.

A schematic diagram of an embodiment of illustrative computing equipment 140 is shown in FIG. 4. Computing equipment 140 may include any suitable computing equipment such as a personal desktop computer, a laptop computer, a server, etc. and may be used to implement computing equipment 14 and/or computing equipment 18 of FIG. 1. Computing equipment 140 may be a server (e.g., an internet server), a local area network computer with or without internet access, a user's own personal computer, a peer device (e.g., another user device 12), other suitable computing equipment, or combinations of multiple pieces of such computing equipment. Computing equipment 140 may be associated with one or more services such as services 18 of FIG. 1.

As shown in FIG. 4, computing equipment 140 may include storage 64 such as hard disk drive storage, nonvolatile memory, volatile memory, etc. Processing circuitry 62 may be used to control the operation of computing equipment 140. Processing circuitry 62 may be based on one or more processors such as microprocessors, microcontrollers, digital signal processors, application specific integrated circuits, and other suitable integrated circuits. Processing circuitry 62 and storage 64 may be used to run software on computing equipment 140 such as speech recognition applications, operating system functions, audio capture applications, other applications with voice recognition and/or audio capture functionality, and other software applications.

Input-output circuitry 66 may be used to gather user input and other input data and to allow data to be provided from computing equipment 140 to external devices. Input-output circuitry 66 can include devices such as mice, keyboards, touch screens, microphones, speakers, displays, televisions, speakers, wired communications circuitry, and wireless communications circuitry.

Figure 5:
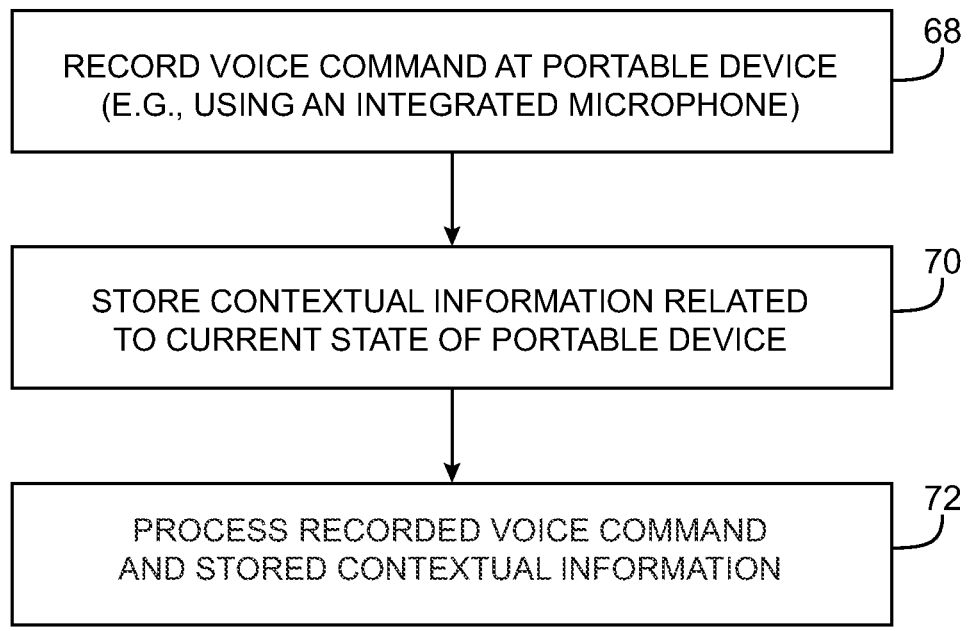
FIG. 5 is a flowchart of illustrative steps involved in using a portable electronic device to receive and process voice commands in accordance with an embodiment of the present invention.

Illustrative steps involved in using an electronic device such as user device 12 to gather voice commands and contextual information are shown in FIG. 5.

At step 68, an electronic device such as user device 12 of FIG. 1 may receive a voice command. Voice commands may be received from a user using an integrated microphone such as a microphone in microphone port 42. If desired, voice commands may be received using an external microphone (e.g., a microphone in an accessory such as a wired or wireless headset).

Voice commands may be recorded (e.g., stored) in storage such as storage 44 of FIG. 3. Voice commands may be stored as a digital audio recording (e.g., an MP3 audio clip). With one suitable arrangement, voice commands may be stored in long-term storage (e.g., nonvolatile memory, hard disk drive storage, etc.) so that the voice commands may be processed at a later time. If desired, voice commands may be stored in short-term storage (e.g., volatile memory).

At step 70, user device 12 may store contextual information related to the current state of the user device. The contextual information may include any information that is available about the current state of the user device. For example, the contextual information may include information related to a current media playback operation (e.g., media attributes such as a track name, a title, an artist name, an album name, year, genre, etc.), a current web-browsing operation (e.g., a current web-address), the geographic location of the user device (e.g., a location determined using a location sensor, a location derived from information associated with communications path 20 and 21 such as which cellular telephone network or other network the device is connected to, or location data manually entered by a user), the current date and time, a telephone operation (e.g., a telephone number or contact information associated with a current or previous telephone call), information from other software applications running on device 12 such as mapping applications, business productivity applications, email applications, calendar applications, calendar applications, games, etc. The contextual information may include contextual information related to operations occurring in the background of the operation of device 12. For example, contextual information may include media playback information in addition to web browsing information when user device 12 is being used to browse the Internet while listening to music in the background.

With one suitable arrangement, user device 12 may store voice commands as audio clips without performing local voice recognition operations. If desired, user device 12 may perform a speech recognition operation on a voice command. The results of this operation may be used to convert the command into a code or may be used to determine which contextual information is most relevant. Device 12 may then store this most relevant contextual information. For example, user device 12 may perform a preliminary speech recognition operation to search for specific keywords such as "music," "location," "near," and other suitable keywords to determine which contextual information would be most relevant. With this type of arrangement, keywords such as "location" and "near" may indicate that location information is relevant while keywords such as "music" may indicate that information associated with a current media playback operation is most likely to be relevant.

A voice command that has been recorded in step 68 may be processed at step 70. User device 12 may process the voice command using a speech recognition engine. When user device 12 processes the voice command, user device 12 may also process contextual information stored in step 70. With one suitable arrangement, user device 12 may process each voice command with a speech recognition application that runs on processing circuitry such as circuitry 46. If the speech recognition application is able to successfully recognize the speech in the voice command, user device 12 may attempt to perform the action or actions requested by the voice command using any relevant contextual information. For example, the voice command "find more music like this" may be interpreted by user device 12 to mean that the user device should perform a search for music that has the same genre as music that was playing when the voice command was received. User device 12 may therefore perform a search for music using the genre of the currently playing music as a search criteria.

With one suitable arrangement, voice commands may be associated with a list of available media files on user device 12 so that the list of media files serve as contextual information. Image captures and captured audio and/or video clips can also serve as contextual information. For example, user device 12 may have an integrated camera that can be used to take pictures. In this example, user device 12 may allow a user to supply a voice command and to associate the voice command with one or more pictures so that the pictures serve as contextual information. In one example of this type of arrangement, if user device 12 receives the voice command "identify this car" and receives information associating the voice command with a picture containing a car, user device 12 may transmit the picture to a service capable of identifying cars from pictures.

Figure 6:
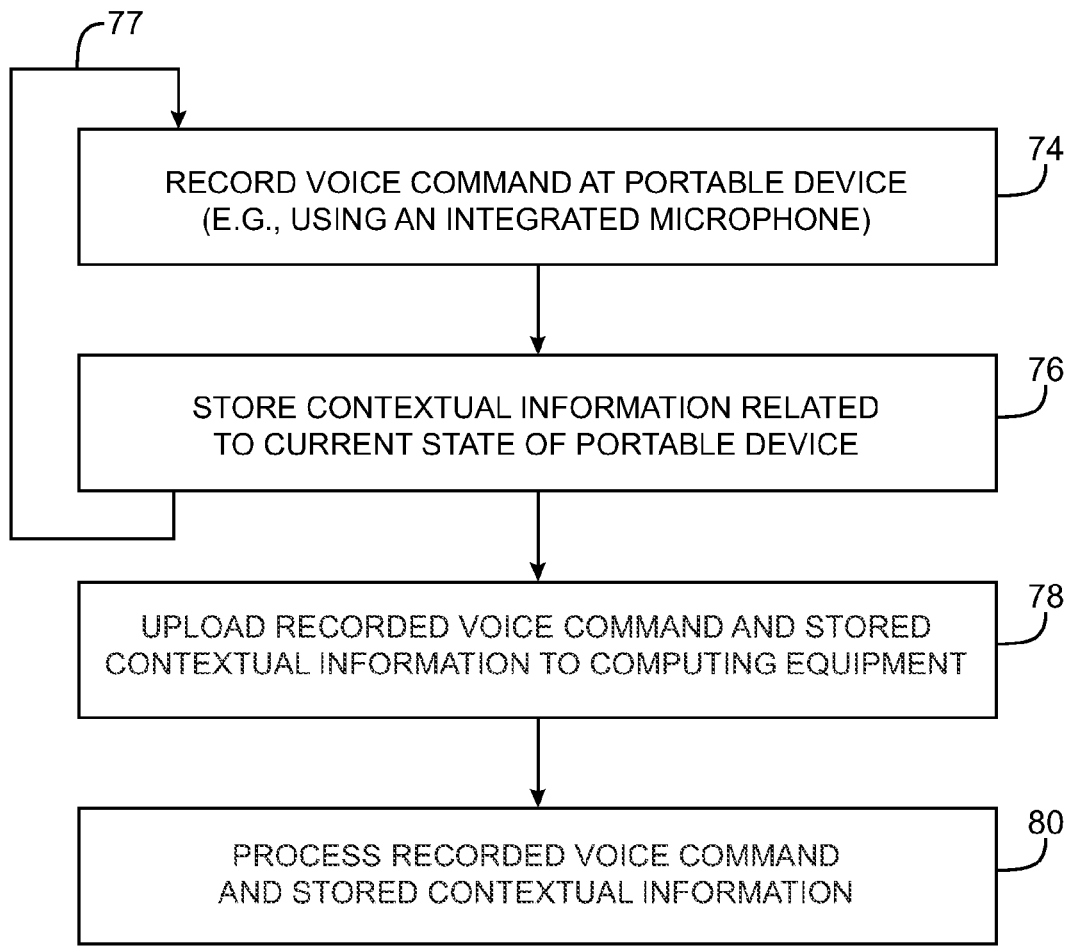
FIG. 6 is a flowchart of illustrative steps involved in using a portable electronic device to receive and upload voice commands and using computing equipment to process the voice commands in accordance with an embodiment of the present invention.

Illustrative steps involved in using a portable electronic device such as user device 12 to receive and upload voice commands and in using computing equipment such as computing equipment 14 to process the uploaded voice commands are shown in FIG. 6.

At step 74, user device 12 may record a voice command. The voice command may be recorded as an audio clip when a user pressed and releases a record button or supplies other user input directing device 12 to capture the voice command. The voice command may be digitized by device 12 and stored in storage associated with user device 12 such as storage 44.

At step 76, user device 12 may store contextual information in storage. If desired, user device 12 may store only the contextual information that is relevant to the captured voice command. As indicated by line 77, the operations of steps 74 and 76 may be repeated (e.g., user device 12 may record numerous voice commands each of which may be associated with corresponding contextual information).

If desired, user device 12 may present the user with an opportunity to record an audio clip that includes both a voice command and contextual information. An example of a possible audio clip that includes both a voice command and contextual information and that could be received by user device 12 is "create new event for Sunday, July 18th: James's Birthday." In this example, the voice command corresponds to the user's desire for user device 12 to create a new calendar event and the relevant contextual information is included in the audio clip (e.g., the date of the new event "Sunday, July 18th" and the title of the new event "James's Birthday").

At step 78, user device 12 may upload recorded voice commands and stored contextual information to computing equipment such as equipment 14 or equipment 18. User device 12 may upload recorded voice commands and stored contextual information to computing equipment 14 or equipment 18 using any suitable communications path. For example, user device 12 may transmit voice commands and contextual information to equipment 14 directly over communications path 20, indirectly through communications network 16 over paths 17 and 21, or may upload them to equipment 18 over network 16.

The operations of step 78 may be performed at any suitable time. For example, user device 12 may upload stored voice commands and contextual information whenever user device 12 is coupled to the computing equipment directly (e.g., through a communications path such as path 20 which may be a Universal Serial Bus® communication path), whenever user device 12 is coupled to computing equipment indirectly (e.g., through communication network 16 and paths 17 and 21), whenever voice commands are recorded at step 74 and a communications link to the computing equipment is available, on demand (e.g., when user device 12 receives a command from a user to process voice commands by uploading them to the computing equipment), at regular intervals (e.g., every ten minutes, every half hour, every hour, etc.), and at combinations of these and other suitable times.

At step 80, computing equipment such as computing equipment 14 or 18 may process voice commands and contextual information from user device 12. Computing equipment 14 or 18 may process voice commands using speech recognition software (e.g., speech recognition engines) running on processing circuitry 62 of FIG. 4, as an example. Computing equipment 14 or 18 may utilize contextual information in processing the associated voice command. For example, when a voice command requests that more music be found that is similar to a given media file, computing equipment 14 or 18 may perform a search of music based on information about the given media file. In another example, the voice command "find nearby retail establishments" may be interpreted by user device 12, computing equipment 14, or equipment 18 to mean that a search should be performed for retail establishments that are within a given distance of user device 12. The given distance may be any suitable distance such as a pre-specified distance (e.g., walking distance, one-half mile, one mile, two miles, etc.) and a distance specified as part of the voice command. The voice command may also specify which types of retail establishments the search should include. For example, the voice command "find Italian restaurants within three blocks" specifies a type of retail establishment (restaurants), a particular style of restaurant (Italian), and the given distance over which the search should be performed (within three blocks of the geographical location of the user device that received the voice command).

If desired, computing equipment 14 or 18 may fulfill a voice command directly. For example, when user device 12 is connected to computing equipment 14 or 18 (e.g., when device 12 is synched with the equipment), the computing equipment may display results related to the voice command (e.g., a list of similar music) and may perform any appropriate action (e.g., transmit a picture to a car-identification service and then display any results returned by the car-identification service).

With another suitable arrangement, computing equipment 14 or 18 may transmit information related to processing and responding to the voice command to user device 12. In response, user device 12 may then respond to the voice command. This type of arrangement may be particularly beneficial when user device 12 and the computing equipment are not physically located near each other (e.g., when user device 12 is only connected to computing equipment 14 or 18 through long-range communications paths such as through a communications network such as the Internet).

Figure 7:
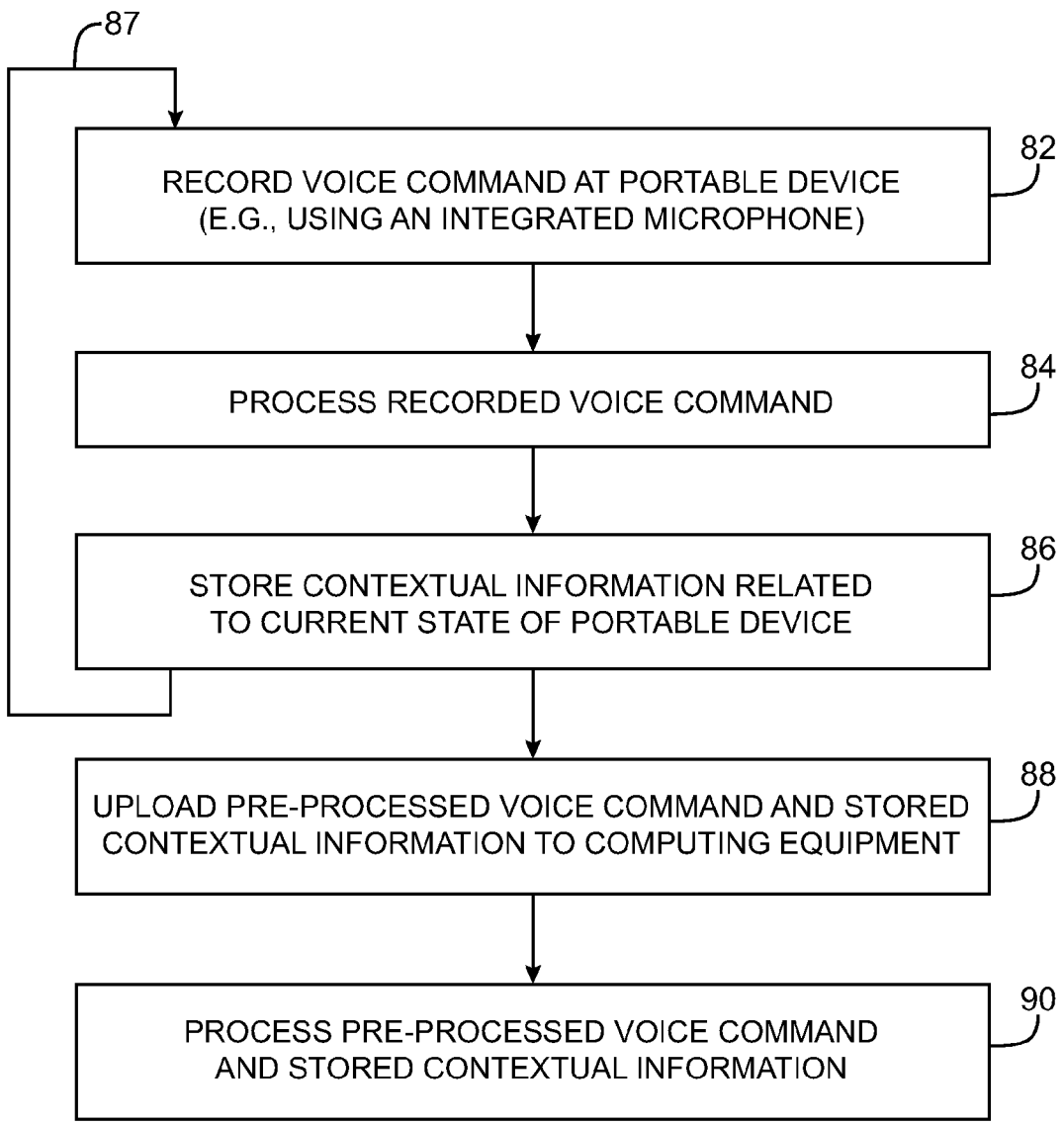
FIG. 7 is a flowchart of illustrative steps involved in using a portable electronic device to receive, process, and upload voice commands and using computing equipment to process the voice commands in accordance with an embodiment of the present invention.

Illustrative steps involved in using a portable electronic device such as user device 12 to receive, process, and upload voice commands and in using computing equipment such as computing equipment 14 or 18 to process the voice commands are shown in FIG. 7.

At step 82, user device 12 may record a voice command. The voice command may be stored in storage such as storage 44.

Following step 82, user device 12 may process the recorded voice command at step 84. User device 12 may process the voice command at any suitable time (e.g., as the voice command is received or at any later time). If desired, user device 12 may perform a preliminary speech recognition operation to determine which portions of the available contextual information are relevant to the voice command. Device 12 may search for specific keywords in the voice command to determine which portions of the available contextual information are relevant, as an example. With another suitable arrangement, device 12 may perform a more thorough speech recognition operation. In this type of arrangement, device 12 may determine that it is able to respond to the voice command immediately (e.g., by executing an operation or by retrieving appropriate information from an appropriate service 18).

If desired, user device 12 may be trained to one or more users' voices. For example, user device 12 may instruct each user to speak a specific set of sample words in order to train its speech recognition operations to be as accurate as possible for each particular user.

When device 12 is not able to fulfill the voice command at the time the voice command is received, device 12 may store contextual information related to the state of user device 12 at the time the voice command was received in storage (step 86).

As illustrated by line 87, the operations of steps 82, 84, and 86 may optionally be repeated as user device 12 receives numerous voice commands that it is not able to fulfill (e.g., respond to) without further processing by computing equipment 14 or 18.

At step 88, user device 12 may upload one or more voice commands and contextual information associated with each of the voice commands to computing equipment 14 or 18. User device 12 may upload the voice commands to computing equipment 14 or 18 at any suitable time.

At step 90, computing equipment 14 or 18 may process voice commands received from user device 12. Computing equipment 14 or 18 may utilize the contextual information associated with each voice command in processing each of the voice commands (e.g., in using a speech recognition engine to process each voice command and associated contextual information).

If desired, computing equipment 14 or 18 may be trained to one or more users' voices. For example, computing equipment 14 or 18 may instruct each user to speak a specific set of sample words in order to train its speech recognition operations to be as accurate as possible for each particular user. With one suitable arrangement, computing equipment 14 or 18 and user device 12 may share information related to training speech recognition operations to particular users.

The voice commands processed and stored by user device 12 and processed by computing equipment 14 or 18 may include any suitable voice commands. With one suitable arrangement, user device 12 and computing equipment 14 or 18 may each have a respective dictionary of voice commands that can be recognized using the speech recognition capabilities of user device 12 and computing equipment 14 or 18. Because computing equipment 14 or 18 may include any type of computing equipment including desktop computers and computer servers which generally have relatively large amount of processing and storage capabilities compared to portable devices such as user device 12, computing equipment 14 or 18 will generally have a larger dictionary of voice commands that the equipment can recognize using speech recognition operations. By uploading voice commands and contextual information from user device 12 to computing equipment 14 or 18, the probability that a given voice command can be successfully processed and fulfilled will generally increase. With one suitable arrangement, user device 12 may have a closed dictionary (e.g., a dictionary containing only specific keywords and phrase) whereas computing equipment 14 or 18 may have an open dictionary (e.g., a dictionary that can include essentially any word or phrase and which may be provided by a service such as one of services 18).

When user device 12 is not connected to communications networks such as network 16 or to computing equipment 14 or 18 over path 20, user device 12 may not always have the capabilities required to satisfy (e.g., fulfill) a particular voice command at the time the voice command is received. For example, if user device 12 is not connected to a communications network and receives a voice command to "find more music like this," user device 12 may be able to determine, using a speech recognition dictionary associated with device 12, that a user wants device 12 to perform a search for music that matches the profile of music currently playing through device 12. However, because user device 12 is not currently connected to a communications network, device 12 may not be able to perform the search immediately. In this situation, device 12 may store the voice command and perform the requested action later at an appropriate time (e.g., when device 12 is connected to computing equipment 14 or 18 or when device 12 connects to a service at equipment 18 through a communications network such as network 16).

Because user device 12 can upload voice commands and contextual information to computing equipment 14 or 18, user device 12 may be able to support an increased amount of voice commands and may be able to respond in a more complete manner than if user device 12 performed speech recognition operations without the assistance of equipment 14 or 18. For example, user device 12 can record voice commands that it is unable to comprehend using its own speech recognition capabilities and can transmit the voice commands and relevant contextual information to computing equipment 14 or 18, which may be more capable and therefore more able to comprehend and respond to the voice commands.

As the foregoing demonstrates, users can capture voice commands on device 12 for immediate processing in a device that includes a speech recognition (voice processing) engine. In the event that no speech recognition processing functions are implemented on device 12 or when it is desired to offload voice recognition functions to remote equipment, device 12 may be used to capture an audio clip that includes a voice command.

Any suitable user interface may be used to initiate voice command recording operations. For example, a dedicated button such as a record button may be pressed to initiate voice command capture operations and may be released to terminate voice command capture operations. The start and end of the voice command may also be initiated using a touch screen and on-screen options. The end of the voice command clip may be determined by the expiration of a timer (e.g., all clips may be three seconds long) or device 12 may terminate recording when the ambient sound level at the microphone drops below a given threshold.

Recorded audio clips may be digitized in device 12 using any suitable circuitry. As an example, device 12 may have a microphone amplifier and associated analog-to-digital converter circuitry that digitizes audio clips. Audio clips may be compressed (e.g., using file formats such as the MP3 format).

Contextual information may be captured concurrently. For example, information may be stored on the current operating state of device 12 when a user initiates a voice command capture operation. Stored contextual information may include information such as information on which applications are running on device 12 and their states, the geographic location of device 12 (e.g., geographic coordinates), the orientation of device 12 (e.g., from an orientation sensor in device 12), information from other sensors in device 12, etc.

Because voice command processing can be deferred until device 12 is connected to appropriate computing equipment, it is not necessary for device 12 to immediately communicate with the computing equipment. As user may, for example, capture voice commands while device 12 is offline (e.g., when a user is in an airplane without network connectivity). Device 12 may also be used to capture voice commands that are to be executed by the user's home computer, even when the user's home computer is not powered.

Later, when device 12 is connected to the user's home computer and/or an online service, the captured voice commands can be uploaded and processed by this external computing equipment. The contextual information that was captured when the voice command was captured may help the external computing equipment (e.g., the user's computer or a remote server) properly process the voice command. The computing equipment to which the voice command is uploaded may be able to access data that was unavailable to device 12 when the command was captured, such as information on the contents of a user's media library or other database, information that is available from an online repository, etc. The computing equipment to which the voice command and contextual information were uploaded may also be able to take actions that are not possible when executing commands locally on device 12. These actions may include actions such as making adjustments to a database on the computing equipment, making online purchases, controlling equipment that is associated with or attached to the computing equipment, etc.

The foregoing is merely illustrative of the principles of this invention and various modifications can be made by those skilled in the art without departing from the scope and spirit of the invention.

What is claimed is:

1. A method for processing voice commands, performed at a portable electronic device with one or more processors and memory storing instructions for execution by the one or more processors, the method comprising:
   in response to user input, recording at least a portion of a voice command on the portable electronic device;
   when recording the portion of the voice command on the portable electronic device, storing contextual information of the portable electronic device;
   after recording the portion of the voice command at the portable electronic device, uploading the portion of the voice command and the stored contextual information from the portable electronic device to remote computing equipment;
   receiving, from the remote computing equipment, results associated with processing the portion of the voice command and the stored contextual information; and
   presenting the results.

2. The method of claim 1, wherein a media player application on the portable electronic device plays media files and wherein storing the contextual information comprises:
   storing information about a given media file being played by the media player application as part of the contextual information stored on the portable electronic device.

3. The method of claim 2, wherein the remote computing equipment comprises a computer running a media player application, and wherein uploading the portion of the voice command and the contextual information comprises:
   uploading the stored information about the given media file and the portion of the voice command to the media player application on the computer.

4. The method of claim 1, wherein storing the contextual information comprises:
   recording an audio clip that contains contextual information.

5. The method of claim 4, wherein recording the audio clip comprises:
   recording words spoken by a user of the portable electronic device.

6. The method of claim 1, wherein the contextual information is a geographical location of the portable electronic device.

7. The method of claim 1, wherein the contextual information is a current web address of a web browser application on the portable electronic device.

8. The method of claim 1, wherein the contextual information is contact information associated with a party to a previous telephone call.

9. The method of claim 1, wherein the user input comprises an activation of an on-screen selectable option and wherein recording the portion of the voice command comprises recording the portion of the voice command on the portable electronic device in response to the activation of the on-screen selectable option.

10. The method of claim 1, wherein the user input comprises a button press and wherein recording the portion of the voice command comprises recording the portion of the voice command on the portable electronic device in response to the button press.

11. The method of claim 1, wherein presenting the results comprises displaying the results on a touch screen of the portable electronic device.

12. A portable electronic device configured to process voice commands, comprising:
   one or more input devices;
   one or more processors; and memory storing one or more programs configured to be executed by the one or more processors, the one or more programs including instructions for:

in response to user input, recording at least a portion of a voice command on the portable electronic device;

when recording the portion of the voice command on the portable electronic device, storing contextual information of the portable electronic device;

after recording the portion of the voice command at the portable electronic device, uploading the portion of the voice command and the stored contextual information from the portable electronic device to remote computing equipment;

receiving, from the remote computing equipment, results associated with processing the portion of the voice command and the stored contextual information; and presenting the results.

13. The portable electronic device of claim 12, wherein the user input comprises a button press and wherein recording the portion of the voice command comprises recording the portion of the voice command on the portable electronic device in response to the button press.

14. The portable electronic device of claim 13, wherein a media player application on the portable electronic device plays media files and wherein storing the contextual information comprises:

storing information about a given media file being played by the media player application as part of the contextual information stored on the portable electronic device.

15. The portable electronic device of claim 14, wherein the remote computing equipment comprises a computer running a media player application, and wherein uploading the portion of the voice command and the contextual information comprises:

uploading the stored information about the given media file and the portion of the voice command to the media player application on the computer.

16. The portable electronic device of claim 12, wherein storing the contextual information comprises:

recording an audio clip that contains contextual information.

17. The portable electronic device of claim 16, wherein recording the audio clip comprises:

recording words spoken by a user of the portable electronic device.

18. The portable electronic device of claim 12, wherein the contextual information is a geographical location of the portable electronic device.

19. The portable electronic device of claim 12, wherein the contextual information is a current web address of a web browser application on the portable electronic device.

20. The portable electronic device of claim 12, wherein the contextual information is contact information associated with a party to a previous telephone call.

21. The portable electronic device of claim 12, wherein the user input comprises an activation of an on-screen selectable option and wherein recording the portion of the voice command comprises recording the portion of the voice command on the portable electronic device in response to the activation of the on-screen selectable option.

22. The portable electronic device of claim 12, wherein presenting the results comprises displaying the results on a touch screen of the portable electronic device.

23. A method for processing voice commands, performed at a portable electronic device with one or more processors and memory storing instructions for execution by the one or more processors, the method comprising:

in response to user input, recording a voice command on the portable electronic device;

processing at least a portion of the voice command using a speech recognition engine to determine at least a portion of contextual information that is relevant to the voice command;

storing the portion of the contextual information that is relevant to the voice command;

transmitting the portion of the voice command and the portion of the contextual information that is relevant to the voice command from the portable electronic device to remote computing equipment;

receiving, from the remote computing equipment, results associated with the voice command and the stored portion of the contextual information; and presenting the results.

24. The method of claim 23, wherein the contextual information is associated with the state of the portable electronic device when the voice command is received by the portable electronic device.

25. The method of claim 23, wherein the remote computing equipment processes the voice command and the portion of the contextual information that is relevant using an additional speech recognition engine.

26. The method of claim 23, wherein the voice command comprises a request from a user to perform a search and wherein processing the voice command and the portion of the contextual information that is relevant comprises performing the search using the portion of the contextual information that is relevant.

27. A portable electronic device configured to process voice commands, comprising:

one or more input devices;

one or more processors;

memory storing one or more programs configured to be executed by the one or more processors, the one or more programs including instructions for:

in response to user input, recording a voice command on the portable electronic device;

processing at least a portion of the voice command using a speech recognition engine to determine at least a portion of contextual information that is relevant to the voice command;

storing the portion of the contextual information that is relevant to the voice command;

transmitting the recorded voice command and the portion of the contextual information that is relevant to the voice command from the portable electronic device to remote computing equipment;

receiving, from the remote computing equipment, results associated with the recorded voice command and the stored portion of the contextual information; and presenting the results.

28. The portable electronic device of claim 27, wherein the contextual information is associated with the state of the portable electronic device when the voice command is received by the portable electronic device.

29. The portable electronic device of claim 27, wherein the voice command comprises a request from a user to perform a search and wherein processing the voice command and the portion of the contextual information that is relevant comprises performing the search using the portion of the contextual information that is relevant.

30. A non-transitory computer readable storage medium storing one or more programs, the one or more programs comprising instructions for execution by an electronic device having one or more processors and memory, the one or more programs comprising instructions for:
  in response to user input, recording a voice command on the portable electronic device;
  when recording the voice command on the portable electronic device, storing contextual information of the portable electronic device;
  after recording at least a portion of the voice command at the portable electronic device, uploading the portion of the voice command and the stored contextual information from the portable electronic device to remote computing equipment;
  receiving, from the remote computing equipment, results associated with processing the portion of the voice command and the stored contextual information; and
  presenting the results.

31. The computer readable storage medium of claim 30, wherein the user input comprises a button press and wherein recording the portion of the voice command comprises recording the portion of the voice command on the portable electronic device in response to the button press.

32. The computer readable storage medium of claim 31, wherein a media player application on the portable electronic device plays media files and wherein storing the contextual information comprises:
  storing information about a given media file being played by the media player application as part of the contextual information stored on the portable electronic device.

33. The computer readable storage medium of claim 32, wherein the remote computing equipment comprises a computer running a media player application, and wherein uploading the portion of the voice command and the contextual information comprises:
  uploading the stored information about the given media file and the portion of the voice command to the media player application on the computer.

34. The computer readable storage medium of claim 30, wherein storing the contextual information comprises:
  recording an audio clip that contains contextual information.

35. The computer readable storage medium of claim 34, wherein recording the audio clip comprises:
  recording words spoken by a user of the portable electronic device.

36. The computer readable storage medium of claim 30, wherein the contextual information is a geographical location of the portable electronic device.

37. The computer readable storage medium of claim 30, wherein the contextual information is a current web address of a web browser application on the portable electronic device.

38. The computer readable storage medium of claim 30, wherein the contextual information is contact information associated with a party to a previous telephone call.

39. The computer readable storage medium of claim 30, wherein the user input comprises an activation of an on-screen selectable option and wherein recording the portion of the voice command comprises recording the portion of the voice command on the portable electronic device in response to the activation of the on-screen selectable option.

40. The computer readable storage medium of claim 30, wherein presenting the results comprises displaying the results on a touch screen of the portable electronic device.

41. A non-transitory computer readable storage medium storing one or more programs, the one or more programs comprising instructions for execution by an electronic device having one or more processors and memory, the one or more programs comprising instructions for:
  in response to user input, recording a voice command on the portable electronic device;
  processing at least a portion of the voice command using a speech recognition engine to determine at least a portion of contextual information that is relevant to the voice command;
  storing the portion of the contextual information that is relevant to the voice command;
  transmitting the recorded voice command and the portion of the contextual information that is relevant to the voice command from the portable electronic device to remote computing equipment;
  receiving, from the remote computing equipment, results associated with the recorded voice command and the stored portion of the contextual information; and
  presenting the results.

42. The computer readable storage medium of claim 41, wherein the contextual information is associated with the state of the portable electronic device when the voice command is received by the portable electronic device.

43. The portable electronic device of claim 41, wherein the voice command comprises a request from a user to perform a search and wherein processing the voice command and the portion of the contextual information that is relevant comprises performing the search using the portion of the contextual information that is relevant.

44. The method of claim 1, further comprising, prior to uploading the portion of the voice command, converting the portion of the voice command to text, and wherein uploading the portion of the voice command to the remote computing equipment includes uploading the text to the remote computing equipment.

45. The method of claim 1, further comprising, prior to uploading the portion of the voice command, recording the portion of the voice command as an audio clip, and wherein uploading the portion of the voice command to the remote computing equipment includes uploading the audio clip to the remote computing equipment.

46. The method of claim 3, wherein the information about the given media file is selected from the group consisting of: a track name; a track title; an artist name; an album name; and an album genre.

47. The method of claim 1, wherein the contextual information is one or both of a current date and a current time.

48. The portable electronic device of claim 12, the one or more programs including instructions for, prior to uploading the portion of the voice command, converting the portion of the voice command to text, and wherein uploading the portion of the voice command to the remote computing equipment includes uploading the text to the remote computing equipment.

49. The portable electronic device of claim 12, the one or more programs including instructions for, prior to uploading the portion of the voice command, recording the portion of the voice command as an audio clip, and wherein uploading the portion of the voice command to the remote computing equipment includes uploading the audio clip to the remote computing equipment.

50. The portable electronic device of claim 15, wherein the information about the given media file is selected from the group consisting of: a track name; a track title; an artist name; an album name; and an album genre.

51. The portable electronic device of claim 12, wherein the contextual information is one or both of a current date and a current time.

52. The method of claim 23, wherein processing the portion of the voice command using the speech recognition engine includes converting the portion of the voice command to text, and wherein transmitting the portion of the voice command to the remote computing equipment includes transmitting the text to the remote computing equipment.

53. The method of claim 23, wherein processing the portion of the voice command using the speech recognition engine includes recording the portion of the voice command as an audio clip, and wherein transmitting the portion of the voice command to the remote computing equipment includes transmitting the audio clip to the remote computing equipment.

54. The method of claim 23, wherein a media player application on the portable electronic device plays media files, and wherein storing the portion of the contextual information comprises:
   storing information about a given media file being played by the media player application as part of the portion of the contextual information stored on the portable electronic device.

55. The method of claim 54, wherein the remote computing equipment comprises a computer running a media player application, and wherein transmitting the portion of the voice command and the portion of the contextual information comprises:
   transmitting the stored information about the given media file and the portion of the voice command to the media player application on the computer.

56. The method of claim 55, wherein the information about the given media file is selected from the group consisting of: a track name; a track title; an artist name; an album name; and an album genre.

57. The method of claim 23, wherein the portion of the contextual information is a geographical location of the portable electronic device.

58. The method of claim 23, wherein the portion of the contextual information is a current web address of a web browser application on the portable electronic device.

59. The method of claim 23, wherein the portion of the contextual information is contact information associated with a party to a previous telephone call.

60. The method of claim 23, wherein the portion of the contextual information is one or both of a current date and a current time.

61. The portable electronic device of claim 27, wherein processing the portion of the voice command using the speech recognition engine includes converting the portion of the voice command to text, and wherein transmitting the portion of the voice command to the remote computing equipment includes transmitting the text to the remote computing equipment.

62. The portable electronic device of claim 27, wherein processing the portion of the voice command using the speech recognition engine includes recording the portion of the voice command as an audio clip, and wherein transmitting the portion of the voice command to the remote computing equipment includes transmitting the audio clip to the remote computing equipment.

63. The portable electronic device of claim 27, wherein a media player application on the portable electronic device plays media files, and wherein storing the portion of the contextual information comprises:
   storing information about a given media file being played by the media player application as part of the portion of the contextual information stored on the portable electronic device.

64. The portable electronic device of claim 63, wherein the remote computing equipment comprises a computer running a media player application, and wherein transmitting the portion of the voice command and the portion of the contextual information comprises:
   transmitting the stored information about the given media file and the portion of the voice command to the media player application on the computer.

65. The portable electronic device of claim 64, wherein the information about the given media file is selected from the group consisting of: a track name; a track title; an artist name; an album name; and an album genre.

66. The portable electronic device of claim 27, wherein the portion of the contextual information is a geographical location of the portable electronic device.

67. The portable electronic device of claim 27, wherein the portion of the contextual information is a current web address of a web browser application on the portable electronic device.

68. The portable electronic device of claim 27, wherein the portion of the contextual information is contact information associated with a party to a previous telephone call.

69. The portable electronic device of claim 27, wherein the portion of the contextual information is one or both a current date and a current time.

* * * * *